United States Patent
Stallman et al.

(10) Patent No.: US 10,217,074 B1
(45) Date of Patent: Feb. 26, 2019

(54) MODULAR AUTOMATED INVENTORY SORTING AND RETRIEVING

(71) Applicant: Amazon Technologies, Inc., Seattle, WA (US)

(72) Inventors: Timothy Stallman, Groton, MA (US); Tye Michael Brady, Southborough, MA (US); Michael Robert Bocamazo, Somerville, MA (US); Mafalda Ghira Borges, Madison, WI (US); Harris Scott Davidson, Austin, TX (US); Anders Richard Johnson, Grafton, MA (US); Abigail Phyllis Rodrigues, Somerville, MA (US); Mindy Tieu, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/690,051

(22) Filed: Aug. 29, 2017

(51) Int. Cl.
*G06Q 10/08* (2012.01)
*G06Q 50/28* (2012.01)

(52) U.S. Cl.
CPC .............. *G06Q 10/08* (2013.01); *G06Q 50/28* (2013.01)

(58) Field of Classification Search
CPC ........ B07C 2501/00; B07C 2501/0063; G06Q 10/08; G06Q 50/28
USPC ....................................................... 209/552
See application file for complete search history.

(56) References Cited

U.S. PATENT DOCUMENTS

| | | | | |
|---|---|---|---|---|
| 7,402,018 | B2 * | 7/2008 | Mountz | B60D 1/465 |
| | | | | 414/331.06 |
| 8,280,547 | B2 * | 10/2012 | D'Andrea | B66F 9/063 |
| | | | | 700/214 |
| 9,087,314 | B2 * | 7/2015 | Hoffman | G06Q 10/087 |
| 9,457,970 | B1 * | 10/2016 | Zevenbergen | B65G 67/02 |
| 9,600,798 | B2 * | 3/2017 | Battles | B65G 1/1373 |
| 10,065,799 | B2 * | 9/2018 | Einav | B65D 21/0235 |
| 2017/0121114 | A1 * | 5/2017 | Einav | B65D 21/0235 |

* cited by examiner

*Primary Examiner* — Terrell H Matthews
(74) *Attorney, Agent, or Firm* — Kilpatrick Townsend & Stockton LLP

(57) ABSTRACT

A modular sorting station includes a frame defining an inbound bay and an outbound bay, each of the inbound and outbound bays being sized to receive an inventory holder containing inventory thereon. A robotic grasper is mounted to the frame and positioned above one of the inbound and outbound bays and operable to transfer inventory items from the inbound bay to the outbound bay, and a sensor mounted to one of the frame or robotic grasper and operable to identify inventory at the inbound bay when the inventory holder is present in the inbound bay. The frame is sized and arranged to align with a material handling grid and permit drive units to transport inventory holders into and out of the inbound bay and/or outbound bays while moving along the material handling grid; and the frame is portable such that the modular sorting station can be moved as a modular unit for rapid deployment.

13 Claims, 21 Drawing Sheets

MODULAR AUTOMATED INVENTORY SORTING AND RETRIEVING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, sorting, retrieving, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Inventory systems can enhance throughput by efficiently using space and by employing automation, including robotic means to lift, transport, and place inventory. One heretofore significant drawback in such automation has been the difficulty that robotic inventory handlers have in locating objects co-located in containers. Furthermore, robotic inventory handlers can be expensive and time-consuming to implement, unlike a human workforce, which can be allocated according to need. For that reason, conventional inventory systems continue to utilize personnel for many inventory manipulation tasks, even though human intervention tends to increase costs and decrease speed throughout any automated system. For these reasons, increased flexibility and performance are desired in robotic inventory handling systems.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having various resources, such as inventory, containers, inventory holders, dunnage, boxes, and the like; and drive units for moving the resources. Specifically, features herein are directed to methods of sorting inventory using modular sorting stations, according to instructions from an inventory system. To this end, the inventory system may include modular sorting stations for sorting inventory items from one set of containers to a different set of containers, from one inventory holder to another inventory holder or container, or from one set of containers to conveyances for routing the inventory items to various destinations in an inventory management system. The inventory system can also possess autonomous ground drive units and other robotics for transporting containers between different modular sorting stations used for different purposes, in order to improve throughput of inventory items in the inventory system.

Figure 1:
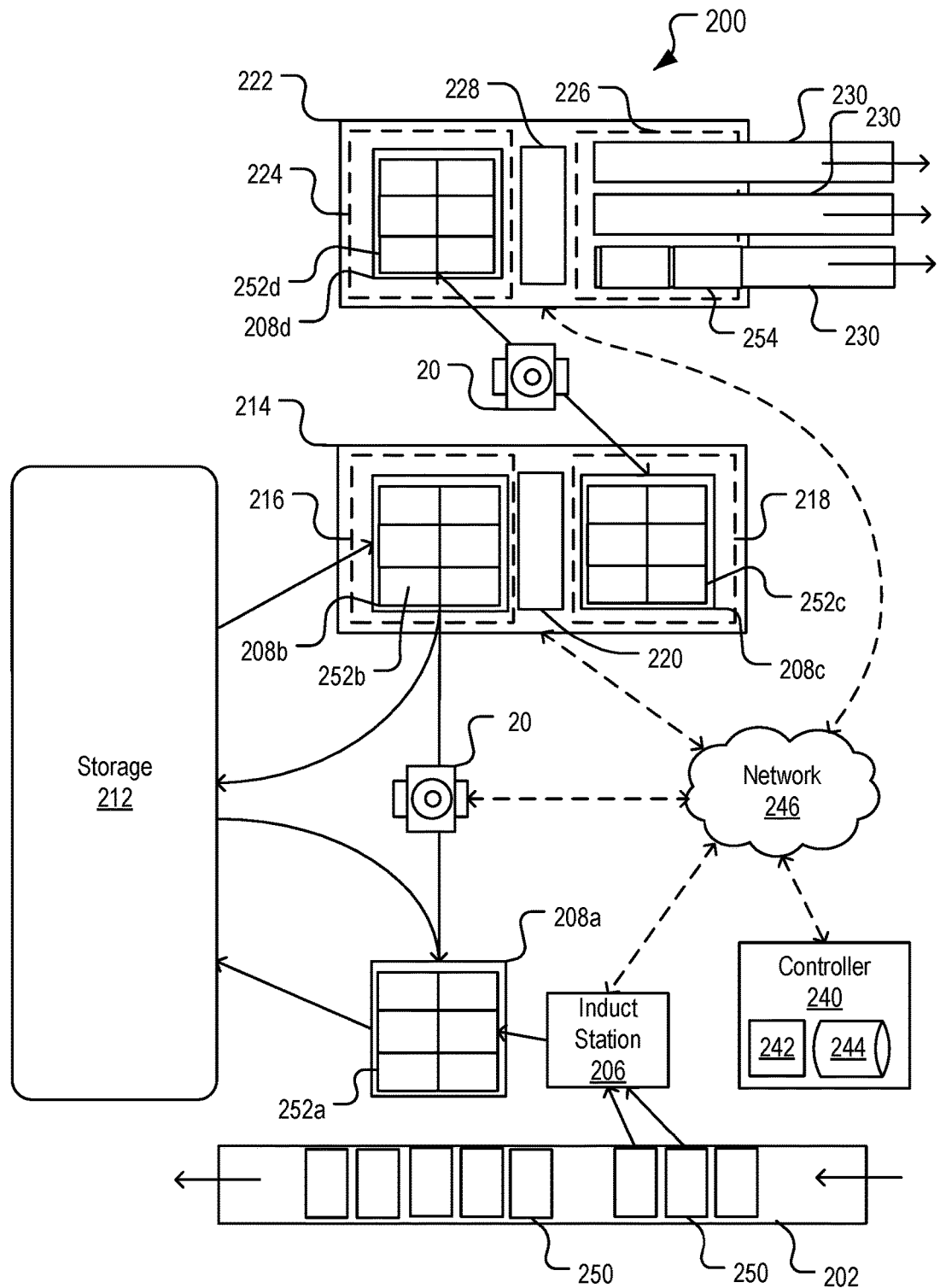
FIG. 1 illustrates an example inventory system in a top view, in accordance with one embodiment.

FIG. 1 illustrates an example inventory system 200 that utilizes modular sorting stations 214, 222, in a top view, in accordance with one embodiment. Aspects of the system 200 are directed by a management component or controller 240, which includes a processor 242 and memory 244. Specific attributes of the controller 240, associated modules, and processes are discussed in greater detail below with reference to FIGS. 18-23. The controller 240 can communicate with other system components via a network 246, such as a wireless network. Aspects of the system 200 are generally carried out in the context of a workspace including a material handling grid, except where stated otherwise. The workspace includes a physical workspace, in which the modular sorting stations 214, 222 are positioned, and on which drive units 20 operate in order to move and store inventory according to the material handling grid. A virtual representation of the material handling grid is maintained by the controller 240 in order to facilitate control over the drive units moving thereon.

The system 200 can include an inbound conveyance 202 such as a chute, conveyor belt, series of shuttles, or the like that moves inbound items 250 into the inventory system. These inbound items 206 can be processed at an induct station 206 and loaded into storage containers 252a on inventory holders 208a for storage. The induct station 206 can be a human-operated station at which items are identified, recorded, and processed for storage; or can be an automated station at which items are robotically handled, scanned via a sensor such as an optical, RFID, or comparable scanner, recorded, and processed for storage. Suitable methods for scanning and handling items are described in, e.g., U.S. Pat. No. 9,600,798, which is hereby incorporated by reference.

During the induct process, the system 200 stores an identifier of each inbound item with an identifier of the respective storage container 252 into which the inbound item is placed. Inventory holders 208 are described in greater detail below with reference to FIGS. 8-13, but generally include at least two distinct containers, or at least two bins in a multi-bin container, which may or may not be connected to one another. In at least one embodiment, inventory holder 208 includes a mobile stage capable of receiving an array of containers thereon, and capable of being moved throughout the inventory system 200 by drive units 20. Alternatively, inventory holders 208 can include multiple connected bins arrayed horizontally, multiple connected shelves arrayed both horizontally and vertically, multiple bins arranged on shelves, or other suitable configurations. Once inducted and placed in an inventory holder 208a, inventory items are transported to a storage region 212 where inventory holders may be arranged for later access.

An initial sorting process can be initiated when a request for a specific inventory item is processed by the controller 240, which retrieves storage information to locate the inventory item in the storage region 212. The system 200 can locate multiple inventory items matching the requested inventory item and select a specific inventory item to retrieve based on, e.g., the relative cost of retrieving each inventory holder containing a matching inventory item. For example, the system 200 can select an inventory holder containing the matching inventory item by selecting the inventory holder that is the nearest to an available initial modular sorting station 214. In at least one embodiment, the "nearest" inventory holder can be the inventory holder in the closest physical proximity; but it can also mean the inventory holder that requires the shortest transit distance via mobile drive unit based on surrounding inventory holders and drive units, or the inventory holder the requires the least time to access based on surrounding inventory holders and drive units.

In one embodiment, the system 200 selects an individual container 252b containing the desired inventory item, and instructs a drive unit 20 to retrieve the individual container. In such cases, the drive unit 20 may retrieve multiple individual containers from storage 212 in each pass, each of the individual containers corresponding to a requested inventory item, resulting in drive units exiting storage with multiple containers each containing a requested inventory item. The selected containers can be combined onto a single inventory holder 208b for retrieval by the drive unit 20.

When the inventory holder 208b containing the desired inventory item or items has been selected in storage 212, the system can direct a drive unit 20 to retrieve the inventory holder and transport the inventory holder to an inbound bay 216 of the initial modular sorting station 214. Aspects of the retrieval, transit, and release of the inventory holders 208 by the drive units 20 are discussed below in detail with reference to FIGS. 2-13. Generally, the drive units 20 can interchangeably connect with and transport inventory holders 208 freely along a material handling grid. When the drive unit 20 transports the inventory holder 208b to the inbound bay 216 of the initial modular sorting station 214, the drive unit may remain linked with the inventory holder, or may release the inventory holder in order to resume other operations in the inventory system 200.

A second inventory holder 208c is transported by a second drive unit 20 to the outbound bay 218 of the initial modular sorting station 214 for receiving sorted items from the inbound bay. The second inventory holder 208c may have the same configuration, or a different configuration, as the inventory holder 208b positioned in the inbound bay 216. The second drive unit 20 may be a different drive unit than the first drive unit that moves the first inventory holder 208b; or in some cases, the same drive unit may be used to place both of the inventory holders by sequentially retrieving one inventory holder and then the other.

In operation, the initial modular sorting station 214 moves items from the inventory holder 208b at the inbound bay 216 to the second inventory holder 208c at the outbound bay. According to one embodiment, the initial modular sorting station 214 scans the inbound bay 216 for the inventory item, grasps the inventory item, and physically moves the inventory item to a container at the outbound bay 218. In cases where the initial modular sorting station 214 is initially unsuccessful at detecting the inventory item in the inbound bay 216, the station can physically move items into an auxiliary container 220 adjacent the inbound bay to reveal an additional layer of items, and then scan the additional layer for the inventory item. This procedure can be repeated until the item is found and moved to the outbound bay, or until all items in the inbound bay 216 have been scanned without detecting the inventory item, in which case the system 200 can generate an error report for presentation to a user. The individual inventory items may be machine-identifiable by way of a machine-readable label, e.g. printed on a bag containing the inventory item, or on any other suitable container in which the inventory item is contained. Some machine-readable labels include electronic tags, e.g. RFID tags; bar codes or QR codes, numerical labels, color-coded indicia, or other comparable tags. In some embodiments, system 200 is able to identify scanned items by capturing an optical reading, e.g. an image of the inventory item, and comparing the image in image-identification software to identify the item.

Once the inventory item has been transferred to the second inventory holder 208c at the outbound bay 218 of the initial modular sorting station 214, the outbound inventory holder can be transferred by a drive unit 20 for further processing. In some cases, further processing can include transit to a different initial modular sorting station, so that other outbound inventory items can be added to the outbound inventory holder 208. Alternatively, the inventory holder 208c at the outbound bay 218 can be retained until additional items have been transferred thereto, until a predetermined number of items have been transferred, or until the system determines that the inventory holder at the outbound bay has reached a capacity based on weight, based on the occupation of containers therein, or other comparable metric.

In embodiments where multiple inventory items are transported from storage 212 via the first inventory holder 208b in a single pass, the initial modular sorting station 214 can transfer each of the requested inventory items from their storage containers 252b to outbound containers 252c. In one embodiment, each requested inventory item from the initial storage containers 252b can be transferred to a respective one of multiple outbound containers 252c. This initial sortation process can be conducted on multiple initial storage containers 252b in parallel, so that the searching and transferring functions of each parallel operation balance out, reducing the inherent unpredictability of search times for each stored inventory item.

A secondary sorting operation can be initiated on inventory items in the inventory holder 208d at the outbound bay 218 of the initial modular sorting station 214. In one embodiment, the inventory holder 208c at the outbound bay 218 of the initial sorting station 214 is transferred by a drive unit 20 to a second inbound bay 224 of a secondary modular sorting station 222. The secondary modular sorting station 222 can include similar features and functionality as the first modular sorting station 214; or in some cases, can include all of the same features. This secondary modular sorting station 222 can scan the second inbound bay 224 for requested inventory items and physically transfer the requested inventory items to the second outbound bay 226 for further processing, e.g., for transfer to an outbound packaging and shipping system, for transfer to a different bay of the inventory system, or other destination. Typically, a first drive unit 20 will be used to move inventory holders 208 between storage 212 and the inbound bay 216 of the initial modular sorting station 214; and a different drive unit 20 will be used to move inventory holders containing outbound items from the outbound bay 218 of the initial modular sorting station to the inbound bay 224 of the secondary modular sorting station 222.

In one embodiment, inventory items sorted by the secondary modular sorting station 222 can be placed directly on fixed conveyance elements 230. Fixed conveyance elements 230 can include any suitable means to remove inventory items from the workspace of the inventory system 200 or for further processing at other locations in the inventory system. Some specific examples of conveyance elements 230 can include a chute, conveyor belt, series of shuttles, or the like, which move the inventory items to the desired destination. Fixed conveyance elements 230 are typically terminal elements that cause inventory items to leave the workspace, such as conveyances to outbound packaging and shipping stations, or outbound transshipment stations for sending inventory items to other inventory systems. In this context, "fixed" typically indicates conveyance elements that are not transported by drive units 20 and are instead location-specific, but are not necessarily permanently fixed in space. Alternatively, the secondary modular sorting station 222 can transfer items to outbound containers 254 which are conveyed, e.g. by fixed conveyance elements 230, or alternatively by drive units 20, to the desired destination. The secondary modular sorting station 222 may selectively transfer each inventory item to a particular conveyance element 230 in order to direct the specific destination. For example, different conveyance elements 230 may transfer items to discrete destinations, such as stations for outbound packing and shipping or intra-facility transfer; or consolidate inventory items to bulk containers or gaylords for transport.

Inventory holders 208b retrieved from storage 212 for the initial sorting process may be subsequently transferred by drive units 20 back to storage 212 directly, or may be transported to the induct station 206 to receive additional inbound items 250. In one embodiment, system 200 can selectively direct inventory holders to either storage 212 or to the induct station 206 depending on the demand for additional inventory holders and depending on the space available in the containers 252, e.g., by directing an inventory holder 208 to receive additional items at the induct station 206 once a predetermined number of items have been removed therefrom.

In one embodiment, the initial modular sorting station 214 and secondary modular sorting station 222 can be used interchangeably by positioning each respective modular sorting station in the appropriate position and registering the modular sorting station with the controller 240 for that purpose. In other words, a modular sorting station becomes an initial sorting station 214 when placed in the inventory system 200 and registered with the controller 240 for that purpose. Typically, the initial sorting stations 214 are also positioned proximate to storage 212 or interior to the inventory system 200 to minimize distances from storage 212. Similarly, a modular sorting station becomes a secondary sorting station 222 when placed in the inventory system 200 and registered for that purpose with the controller 240. Typically, secondary sorting stations 222 are positioned overlapping with fixed conveyances 230, or at a periphery of the inventory system if the stations are not used with fixed conveyances, in order to reduce distances for removing sorted items from the inventory system. Typically, the initial sortation process takes longer to perform than the secondary sorting process; therefore the inventory system 200 can employ multiple initial modular sorting stations 214 for each secondary modular sorting station 222 for purposes of optimizing throughput, as described below with reference to FIG. 18.

As discussed above, drive units 20 can be used flexibly by the system 200 to transport inventory holders 208 throughout the inventory system to modular sorting stations 214, 222 as needed. In some embodiments, conveyances other than drive units may be used to transport containers containing inventory items for access by the modular sorting stations 214, 222. For example, initial modular sorting stations 214 placed within, adjacent, or overlapping with storage 212 can receive inventory containers from storage directly rather than transported by drive units 20, e.g. on any suitable form of fixed conveyance within storage, such as but not limited to conveyers, shuttles, robotic actuators, or the like. Thus, in some cases, initial and secondary sorting stations 214, 222 can resemble one another in reverse, e.g. with fixed conveyances moving inventory items to the initial sorting stations; and fixed conveyances moving sorted inventory items out of the system 200 from the secondary sorting stations.

Figure 2:
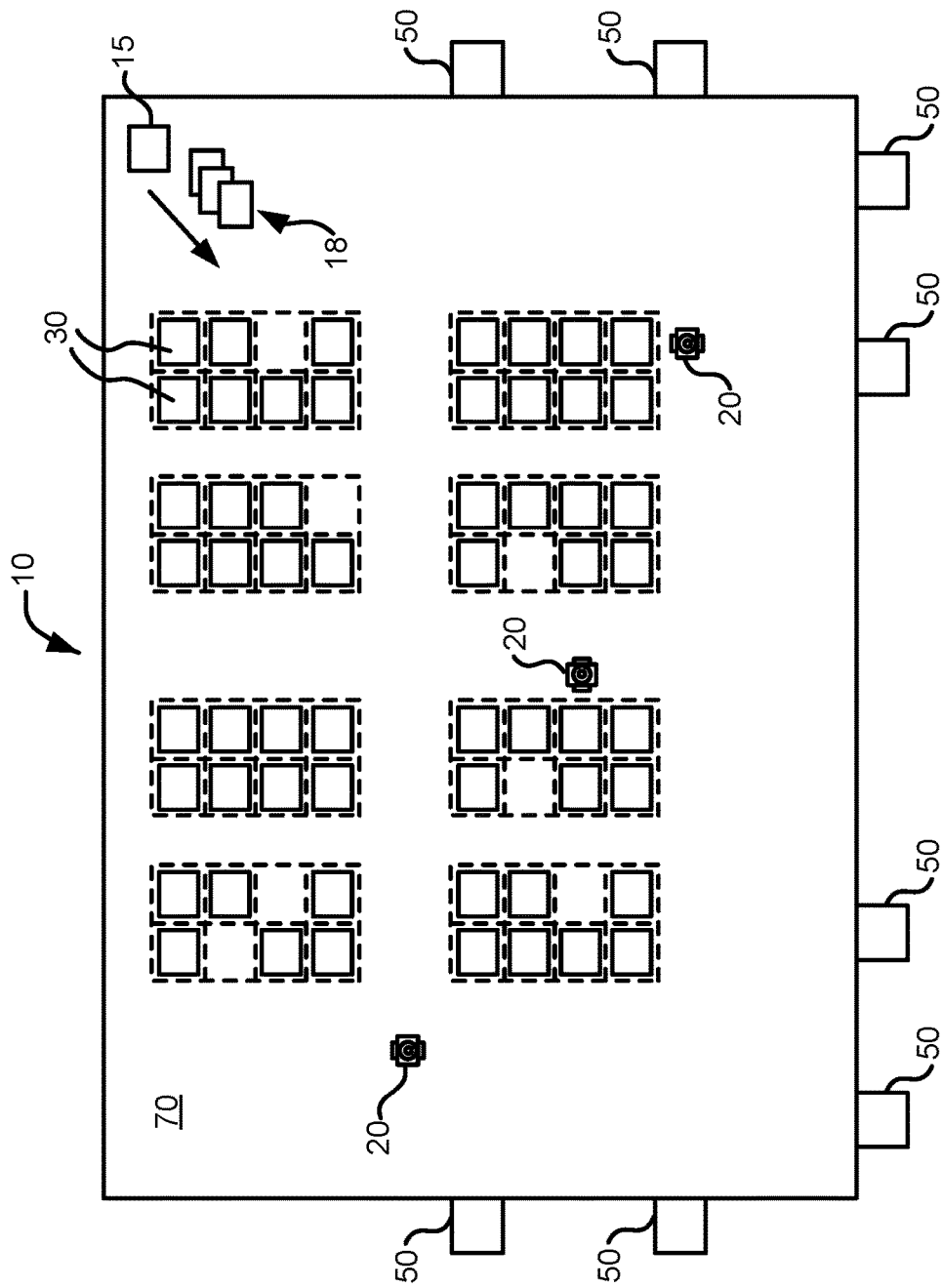
FIG. 2 illustrates components of an inventory system according to a particular embodiment.

Aspects of the inventory system 200 are comparable to inventory system 10, discussed in further detail below with reference to FIGS. 2-12. FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items or other resources.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
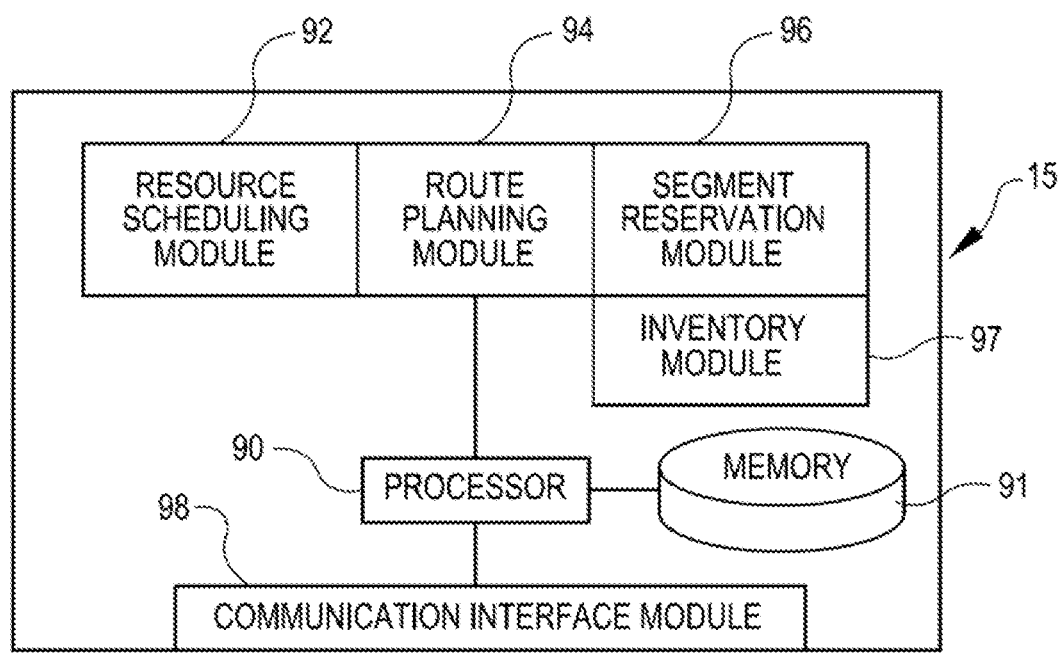
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
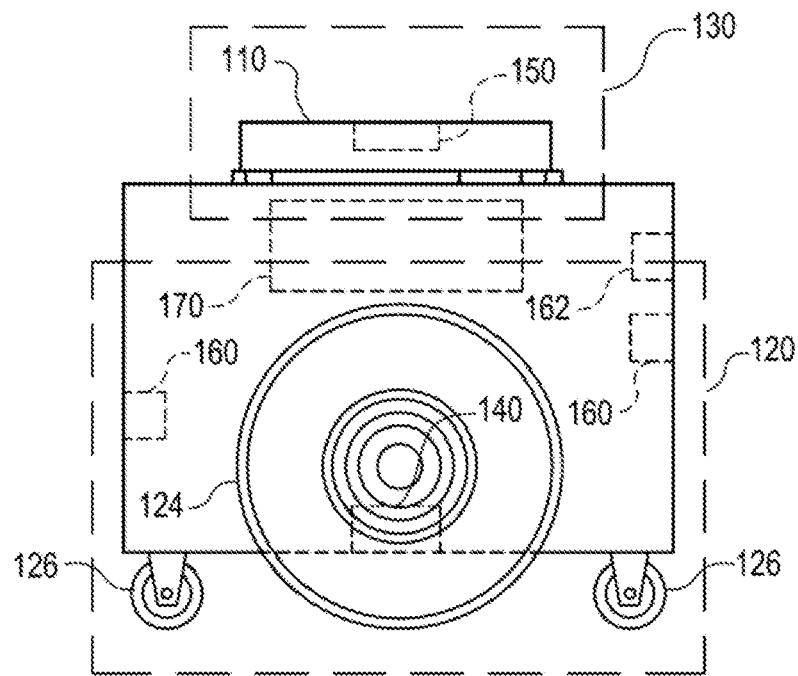
FIGS. 4 and 5 illustrate in greater detail an example mobile drive unit that may be utilized in particular embodiments of the inventory system shown in FIG. 2.
Figure 5:
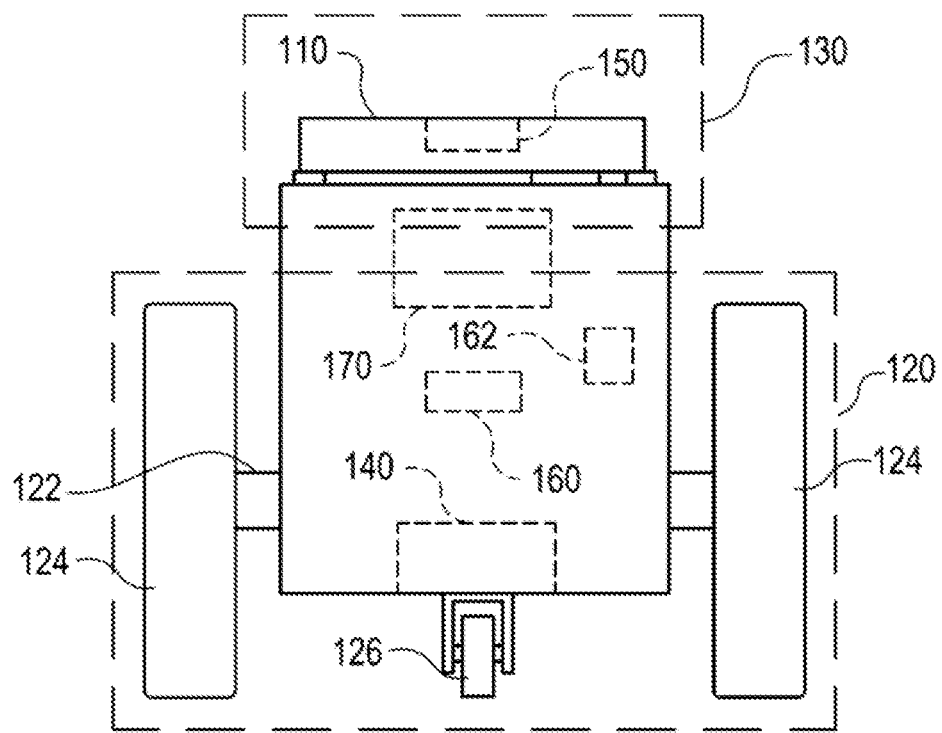

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to self-propel. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
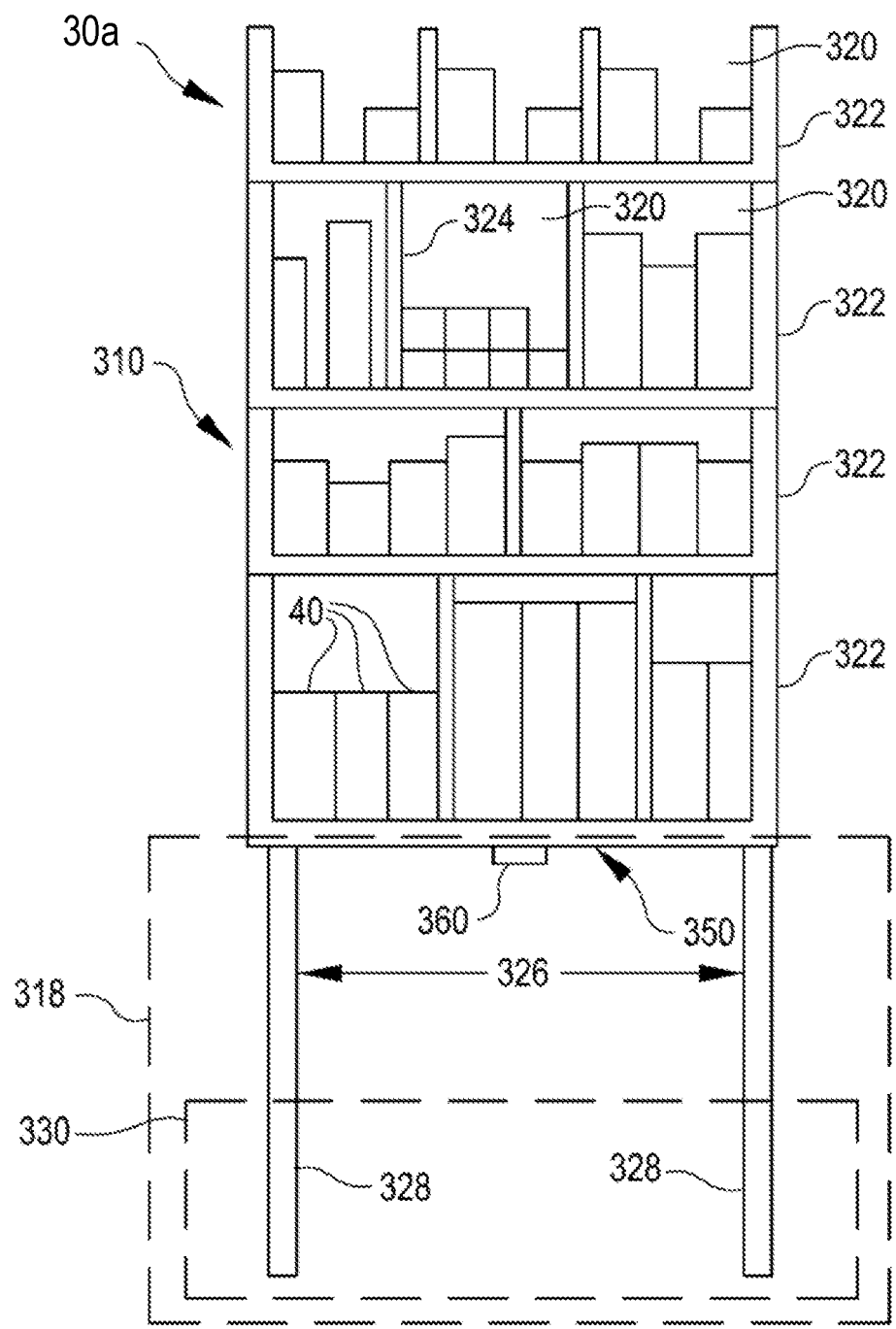
FIG. 6 illustrates in greater detail an example inventory holder that may be utilized in particular embodiments of the inventory system shown in FIG. 2.

FIG. 6 illustrates in greater detail the components of a particular embodiment of inventory holder 30, e.g., holder 30a. In particular, FIG. 6 illustrates the structure and contents of one side of an example inventory holder 30a. In a particular embodiment, inventory holder 30a may comprise any number of faces with similar or different structure. As illustrated, inventory holder 30a includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30a by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30a utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30a that couples to, abuts, and/or rests upon a portion of docking head 110, when mobile drive unit 20 is docked to inventory holder 30a. Additionally, docking surface 350 supports a portion or all of the weight of inventory holder 30a while inventory holder 30a is docked with mobile drive unit 20. The composition, shape, and/or texture of docking surface 350 may be designed to facilitate maneuvering of inventory holder 30a by mobile drive unit 20. For example, as noted above, in particular embodiments, docking surface 350 may comprise a high-friction portion. When mobile drive unit 20 and inventory holder 30a are docked, frictional forces induced between docking head 110 and this high-friction portion may allow mobile drive unit 20 to maneuver inventory holder 30a. Additionally, in particular embodiments, docking surface 350 may include appropriate components suitable to receive a portion of docking head 110, couple inventory holder 30a to mobile drive unit 20, and/or facilitate control of inventory holder 30a by mobile drive unit 20.

Holder identifier 240 marks a predetermined portion of inventory holder 30a and mobile drive unit 20 may use holder identifier 240 to align with inventory holder 30a during docking and/or to determine the location of inventory holder 30a. More specifically, in particular embodiments, mobile drive unit 20 may be equipped with components, such as holder sensor 150, that can detect holder identifier 240 and determine its location relative to mobile drive unit 20. As a result, mobile drive unit 20 may be able to determine the location of inventory holder 30a as a whole. For example, in particular embodiments, holder identifier 240 may represent a reflective marker that is positioned at a predetermined location on inventory holder 30a and that holder sensor 150 can optically detect using an appropriately-configured camera.

Depending on the configuration and characteristics of mobile drive unit 20 and inventory system 10, mobile drive unit 20 may move inventory holder 30a using a variety of appropriate methods. In a particular embodiment, mobile drive unit 20 is capable of moving inventory holder 30a along a two-dimensional grid, combining movement along straight-line segments with ninety-degree rotations and arcing paths to transport inventory holder 30a from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30a. For example, mobile drive unit 20 may rotate inventory holder 30a to present a particular face of inventory holder 30a to an operator of inventory system 10 or other suitable party, such as a packer selecting inventory items 40 from inventory holder 30a. Mobile drive unit 20 may also undock from inventory holder 30a. Alternatively, instead of undocking at the second location, mobile drive unit 20 may transport inventory holder 30a back to the first location or to a third location after any appropriate actions have been taken involving inventory items 40. For example, after a packer has removed particular inventory items 40 from inventory holder 30a, mobile drive unit 20 may return inventory holder 30a to its original storage location, a new storage location, or another inventory station. Mobile drive unit 20 may then undock from inventory holder 30a at this new location.

Figure 7:
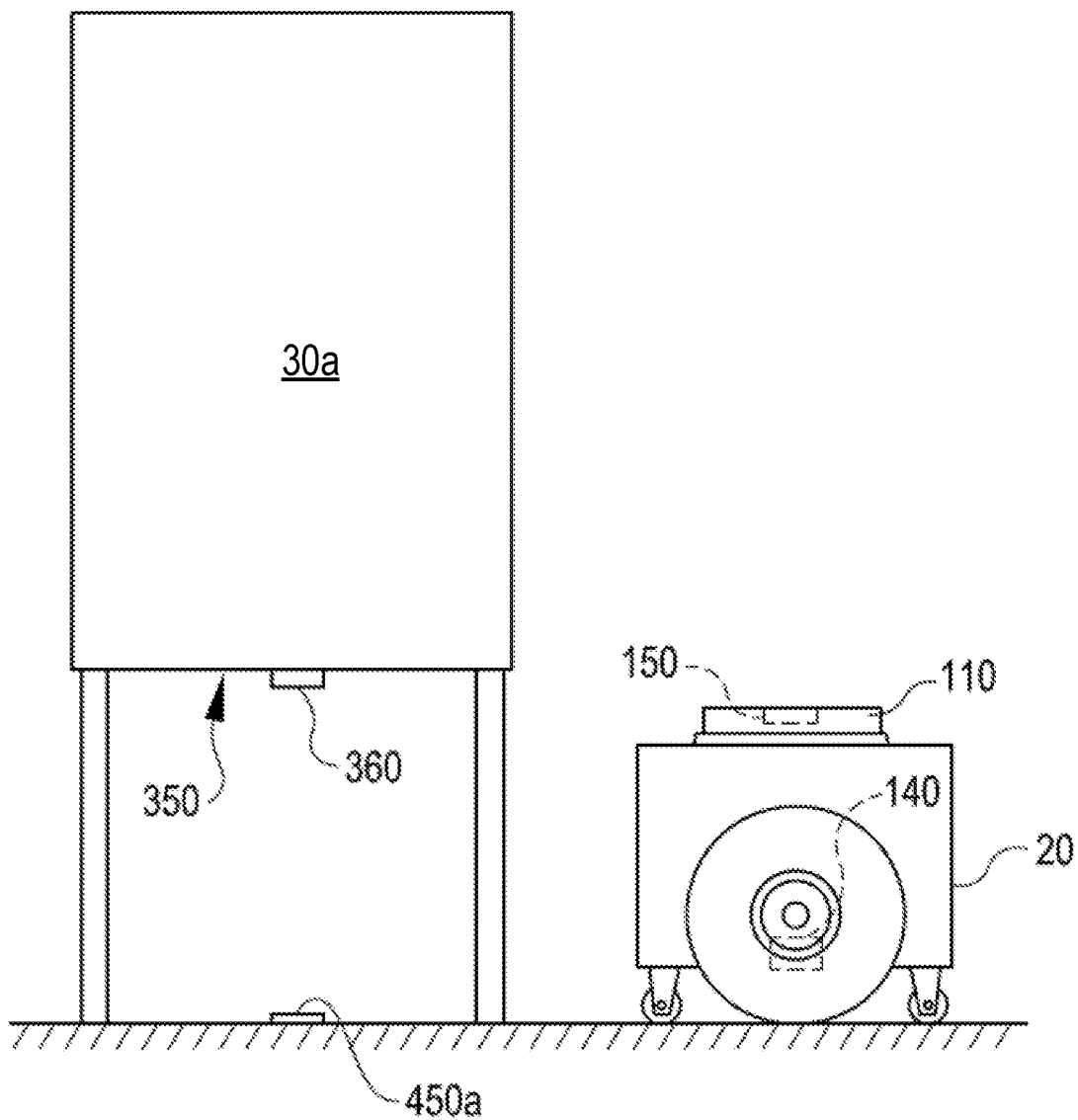
FIGS. 7-12 show operation of various components of the mobile drive unit and the inventory holder during docking, movement and undocking.

FIG. 7 illustrates mobile drive unit 20 and inventory holder 30a prior to docking. As noted above with respect to FIG. 2, mobile drive unit 20 may receive a command that identifies a location for a particular inventory holder 30a. Mobile drive unit 20 may then move to the location specified in the command. Additionally, mobile drive unit 20 may utilize position sensor 140 to determine the location of mobile drive unit 20 to assist in navigating to the location of inventory holder 30a.

In particular, FIG. 7 shows mobile drive unit 20 and inventory holder 30a as mobile drive unit 20 approaches the storage location identified by the received command. In the illustrated embodiment, the reference point is marked by fiducial mark 450a, which comprises a surface operable to reflect light and which, as a result, can be detected by particular embodiments of position sensor 140 when mobile drive unit 20 is positioned over or approximately over fiducial mark 450a. As noted above, the illustrated embodiment of mobile drive unit 20 utilizes optical sensors, including a camera and appropriate image- and/or video processing components, to detect fiducial marks 450.

Figure 8:
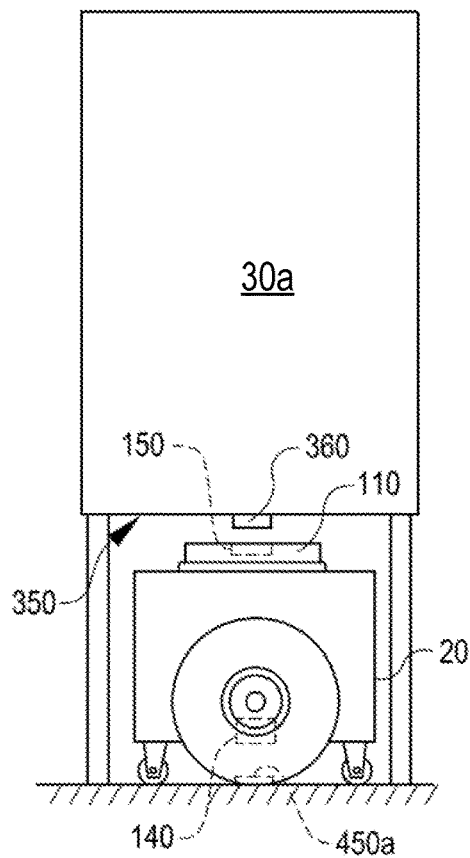

FIG. 8 illustrates mobile drive unit 20 and inventory holder 30a once mobile drive unit 20 reaches fiducial mark 450a. Because, in the illustrated example, fiducial mark 450a marks the location of the reference point to which mobile drive unit 20 is destined, mobile drive unit 20 begins the docking process once mobile drive unit 20 reaches fiducial mark 450a. In the illustrated example, mobile drive unit 20 is configured to dock with inventory holder 30a from a position beneath inventory holder 30a and, as a result, inventory holder 30a is stored so that docking surface 350 is located directly above fiducial mark 450a.

Figure 9:
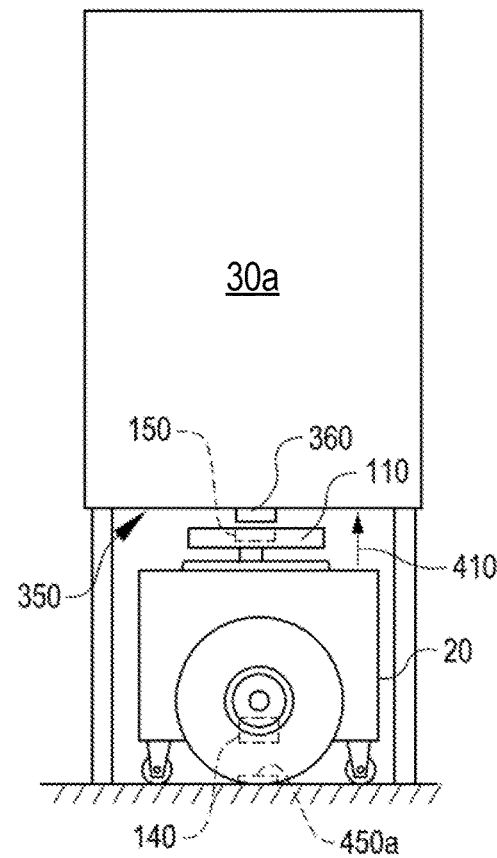

FIG. 9 illustrates operation of mobile drive unit 20 in docking with inventory holder 30a. After positioning itself over fiducial mark 450a, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30a are configured so that mobile drive unit 20 lifts inventory holder 30a off the ground when mobile drive unit 20 docks with inventory holder 30a and, as a result, mobile drive unit 20 supports the weight of inventory holder 30a while mobile drive unit 20 is docked to inventory holder 30a.

Figure 10:
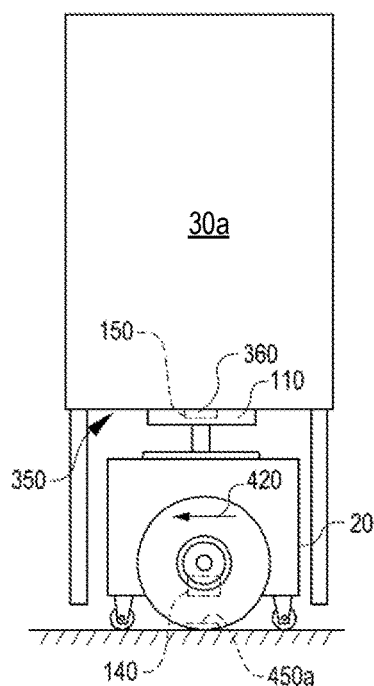

FIG. 10 illustrates operation of mobile drive unit 20 after docking with inventory holder 30a. Mobile drive unit 20 is capable of inducing translational and/or rotational movement in inventory holder 30a while mobile drive unit 20 is docked with inventory holder 30a. For example, in the illustrated embodiment, inventory holder 30a is supported by mobile drive unit 20 while the two components are docked and mobile drive unit 20 is capable of inducing translational and/or rotational movement in inventory holder 30a by moving or rotating itself or some sub-component of itself, such as docking head 110. As a result, while mobile drive unit 20 and inventory holder 30a are docked mobile drive unit 20 may move inventory holder 30a to a requested destination based on commands received by mobile drive unit 20, as suggested by arrow 420.

Once mobile drive unit 20 and inventory holder 30a arrive at the destination, mobile drive unit 20 may additionally rotate inventory holder 30a to present a particular face of inventory holder 30a to a packer or otherwise maneuver inventory holder 30a to allow access to inventory items 40 stored by inventory holder 30a. Mobile drive unit 20 may then undock from inventory holder 30a, as described below, or move inventory holder to another destination. For example, mobile drive unit 20 may move inventory holder 30a to a packing station where a packer can select appropriate inventory items 40 from inventory holder 30a. Mobile drive unit 20 may then return inventory holder 30a to its original location or another location appropriate for undocking, such as a new storage location reserved for inventory holder 30a.

Figure 11:
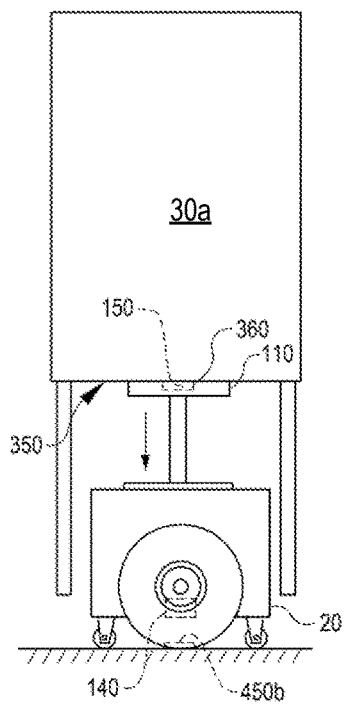

FIG. 11 illustrates mobile drive unit 20 and inventory holder 30a when the two components arrive at an appropriate point for undocking. As noted above, this may represent a final destination specified by the original command, the original storage location for inventory holder 30a, or any other point within the workspace. At or near the destination, mobile drive unit 20 may detect another fiducial mark 450, fiducial mark 450b, associated with the undocking location. Mobile drive unit 20 determines its location based on fiducial mark 450b and, as a result, determines that it has reached the undocking location. After determining that it has reached the undocking location, mobile drive unit 20 initiates an appropriate undocking process based on the configuration and characteristics of mobile drive unit 20 and inventory holder 30a.

Figure 12:
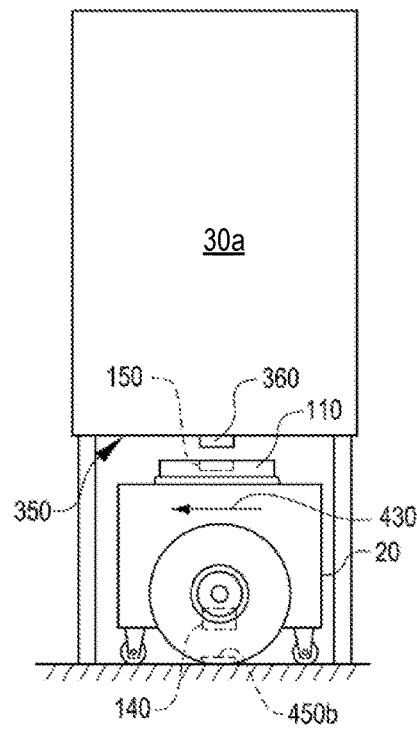

FIG. 12 illustrates a mobile drive unit 20 and inventory holder 30a subsequent to undocking. Mobile drive unit 20 may then move away, as suggested by arrow 430, from inventory holder 30a and begin responding to other commands received by mobile drive unit 20.

Systems and methods for transporting inventory via mobile drive units 20 as described above with respect to inventory holder 30a are applicable to various forms of inventory holders 30 discussed with reference to FIG. 2. For example, suitable inventory holders 30 can include any suitable container or stage for holding inventory, either directly or via intermediate containers. Suitable containers can include pallets, bulk containers, bins, or gaylords, platforms that may be adapted to hold one or more containers thereon, or other suitable holders.

Figure 13:
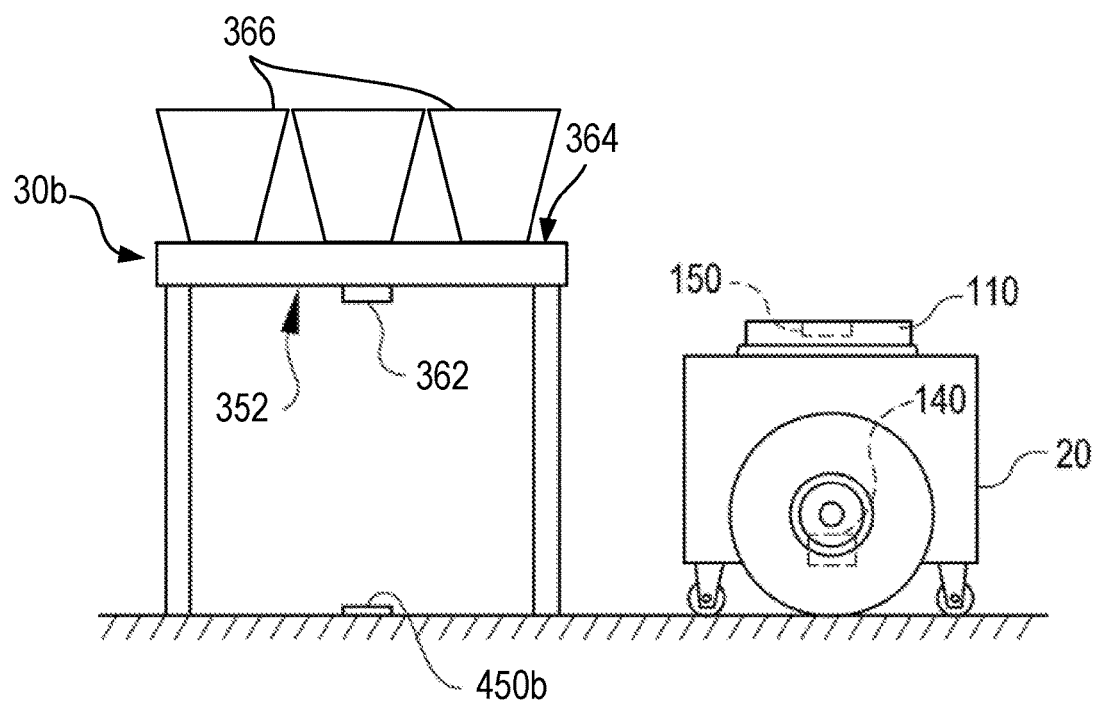
FIG. 13 shows various components of the mobile drive unit and an alternative inventory holder that includes an inventory stage.

For example, FIG. 13 illustrates one example of an alternative inventory holder 30b, which is adapted for use with a drive unit 20 and can carry inventory containers 366. The inventory holder 30b includes a stage 364 adapted to support the inventory containers 366. In one embodiment, the stage 364 is capable of supporting the inventory containers 366 in an array; but in various other embodiments, the stage can carry one or more alternative forms of inventory container as described above, or can carry individual inventory items thereon. The stage 364 can also include a docking surface 352 similar to docking surface 350 (FIGS. 7-12) and a holder identifier 362 (similar to holder identifier 360, FIGS. 7-12) to facilitate the alignment of the inventory holder 30b with drive unit 20.

FIG. 13 illustrates mobile drive unit 20 and inventory holder 30b prior to docking. As noted above with respect to FIGS. 2 and 7, mobile drive unit 20 may receive a command that identifies a location for a particular inventory holder 30b. Mobile drive unit 20 may then move to the location specified in the command. Additionally, mobile drive unit 20 may utilize position sensor 140 to determine the location of mobile drive unit 20 to assist in navigating to the location of inventory holder 30b.

In particular, FIG. 13 shows mobile drive unit 20 and inventory holder 30b as mobile drive unit 20 approaches the storage location identified by the received command. In the illustrated embodiment, the reference point is marked by fiducial mark 450b, which includes a surface operable to reflect light and which, as a result, can be detected by particular embodiments of position sensor 140 when mobile drive unit 20 is positioned over or approximately over fiducial mark 450b. As noted above, the illustrated embodiment of mobile drive unit 20 utilizes optical sensors, including a camera and appropriate image- and/or video processing components, to detect fiducial marks 450b, holder identifier 362, or both. Once connected, the mobile drive units 20 can transport the inventory holder 30b to a modular sorting station such as initial modular sorting station 214 (FIG. 1) or secondary modular sorting station 222 (FIG. 1).

Figure 14:
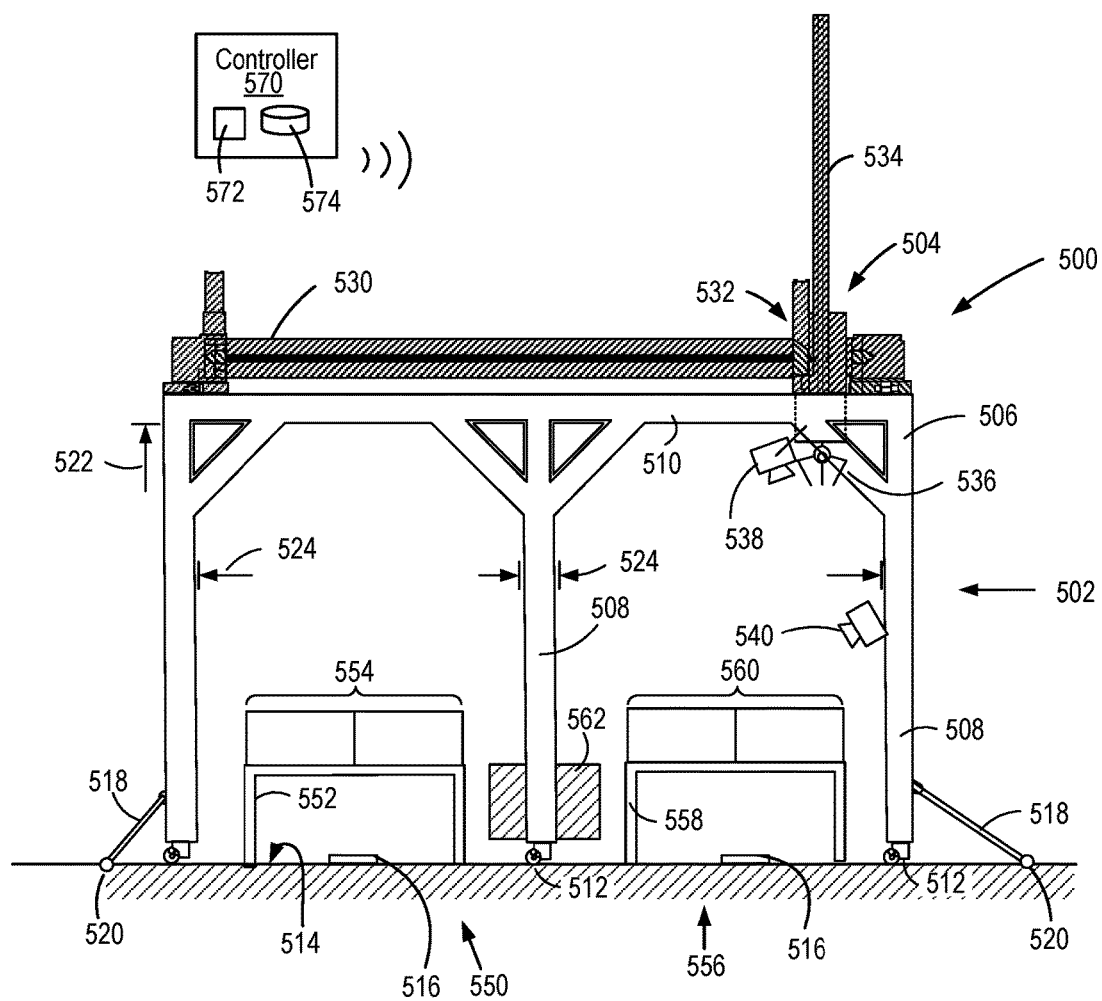
FIG. 14 shows a modular sorting station in a side view, in accordance with at least one embodiment.

FIG. 14 shows a modular sorting station 500 in a side view, in accordance with at least one embodiment. The modular sorting station 500 is shown in a first configuration suitable for use as an initial modular sorting station (e.g., like initial modular sorting station 214 shown in FIG. 1), but can be reconfigured for use as a secondary modular sorting station as discussed above, or used to perform a complete sorting operation. The modular sorting station 500 includes a frame 502 and a robotic grasping assembly 504 mounted to the frame. The frame 502 includes a supported structure 506 including vertical legs 508 and horizontal beams 510 connecting the legs and forming openings suitably wide for allowing drive unit ingress and egress with and without inventory holders thereon. For example, interior widths 524 and heights 522 of each opening are large enough to accommodate ingress or egress of inventory holders 552, 558 when the inventory holders are supported by drive units (e.g. drive units 20, FIGS. 1-13).

The modular sorting station 500 is built around the frame 502 so that the entire sorting station can be readily moved with minimal assembly during positioning. In one embodiment, the modular sorting station 500 includes wheels 512 positioned at ends of each of the legs 508 for allowing rapid deployment of the modular sorting station onto a workspace. In particular, the modular sorting station 500 is suitable for deployment to a machine-navigable material handling grid (e.g. workspace 70, FIG. 2), with the legs 508 being spaced to match a grid spacing of the workspace. In one embodiment, the legs 508 are spaced apart to define two distinct bays underneath the modular sorting station 500, i.e. a first inbound bay 550 and a second, outbound bay 556. The inbound and outbound bays 550, 556 are aligned with adjacent fiducial markings 516 of the workspace that define grid positions of drive units 20, with the legs 508 positioned between grid positions, so that drive units carrying inventory holders can readily pass underneath the modular sorting station without colliding with the legs.

During installation, the modular sorting station 500 can be transported as a modular unit to a specified location on a floor 514 of the workspace. Once aligned with the proper fiducial markings 516, the modular sorting station 500 can be secured to the floor 514, e.g. by locking the wheels 512, and/or by securing the modular sorting station 500 to the floor via alternate securements 518, 520. The alternate securements can include any suitable mechanical securement device, such as posts that penetrate the floor 514, straps or similar mechanical device that connects with the floor 514, or other comparable connective device that secures the modular sorting station in position.

A controller 570, which includes processing 572 and memory 572, is operable to communicate with the modular sorting station 500 to direct sorting operations by the modular sorting station. Once the modular sorting station 500 is aligned in the workspace, a unique identifier of the modular sorting station can be registered with the controller along with the positions associated with the respective fiducial markings 516 at which the modular sorting station 500 is secured. Thus, the controller 570 can immediately begin to utilize the modular sorting station once it is deployed. The modular sorting station 500 can also be readily recalled by rescinding its registration with the controller 570, disconnecting the modular sorting station from the floor 514, and moving the modular sorting station to a different location or off of the workspace floor. Thus, modular sorting stations may be easily moved to accommodate increased loads (e.g. seasonal loads), for maintenance, or during routine reconfigurations of the workspace.

Figure 15:
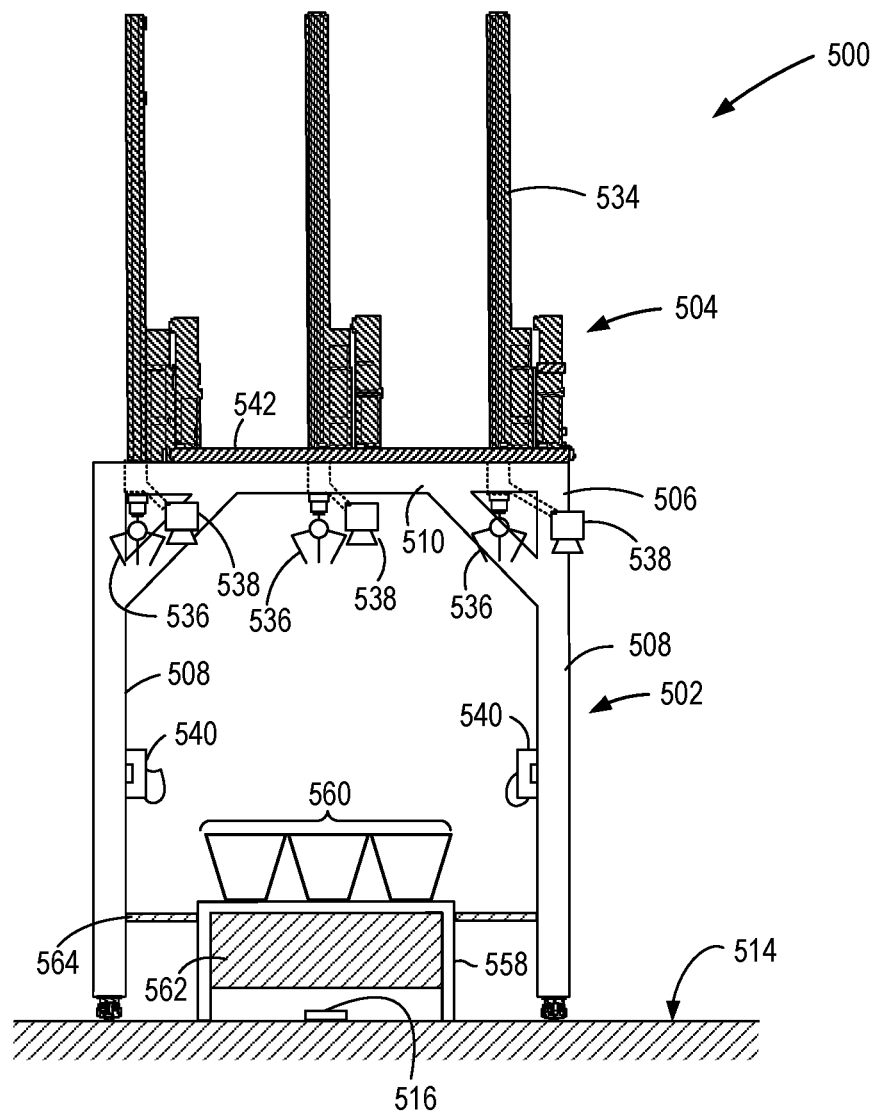
FIG. 15 shows the modular sorting station of FIG. 14 in a side view.

The robotic grasping assembly 504 is mounted to the frame 502, e.g. to the horizontal beams 510 defining the top of the frame, so that the grasping assembly can access any items within the inbound or outbound bays 550, 556 of the modular sorting station 500. In one embodiment, the robotic grasping assembly 504 includes horizontal gantry rails 530 along which robotic graspers 532 can travel. The robotic graspers 532 can also travel vertically, e.g. using vertical rails 534, or horizontally out of plane using orthogonally oriented rails 542 (FIG. 15, below). Each robotic grasper 532 includes a grasping element 536, such as a grasping claw, suction device, adhesive device, or other suitable grasping element for gripping and moving an inventory item. In one embodiment, individual inventory items are contained in robotable containers, i.e. bags or comparable containers which are configured to readily allow grasping by the robotic grasping element 536.

When the modular sorting station 500 is installed on the workspace floor 514, the modular sorting station can be used to sort items from the first, inbound bay 550 to the second, outbound bay 556. In one embodiment, the modular sorting station 500 uses sensors 538 mounted to the robotic graspers 532 that move with the grasping elements 536. Alternatively, or in addition, the modular sorting station 500 can use sensors 540 mounted to the frame 502 of the modular sorting station. The sensors 540 on the frame 502 can be mounted in any suitable position from which the sensors can scan the inbound bay 550 of the modular sorting station 500, e.g., adjacent and offset from the inbound bay 550, above the inbound bay, between the inbound and outbound bays 550, 556, or adjacent the outbound bay. The sensors 538, 540 can be used in conjunction with the robotic grasping assembly 504 to scan the inbound bay 550 for requested inventory items, detect the position of the requested inventory items, and direct the robotic grasping assembly to retrieve and transfer the requested inventory items.

In operation, the modular sorting station 500 receives an inbound inventory holder 552 at the inbound bay 550, e.g. via a drive unit such as drive unit 20 (FIGS. 1-13), which is placed in alignment with the modular sorting station and a designated fiducial marking 516. In one embodiment, the inbound inventory holder 552 includes multiple containers 554 thereon which contain requested inventory items. The modular sorting station 500 also receives an outbound inventory holder 558 at the outbound bay 556 aligned with another designated fiducial marking 516. The outbound inventory holder 558 can also container thereon multiple outbound containers 560. Under the control of the controller 570, the modular sorting assembly 500 can scan the inbound bay 550, including any inbound containers 554, for inventory items matching a requested inventory item. When the requested inventory item is detected by the sensors 538, 540, the modular sorting system 500 can utilize the robotic grasping assembly 504 to grasp the inventory item, and transfer the detected inventory item from the inbound bay 550 (e.g. from within an inbound container 554) to the outbound bay 556 (e.g., into a designated outbound container 560).

An auxiliary container 562 can be connected with the modular sorting station 500 adjacent the inbound bay 550 for temporarily receiving inventory items during a sorting procedure. For example, when the sensors 538, 540 are unable to detect the requested inventory item in one or more of the inbound containers 554, the controller 570 can direct the robotic grasping assembly 504 to remove inventory items from the inbound containers and temporarily store the inventory items in the auxiliary container 562. The modular sorting assembly 500 can then be directed to perform an additional attempt at detecting the inventory item in the inbound containers 554. This process may be repeated until the inventory item is found, or until the contents of the inbound containers are exhausted, at which point the controller 570 can generate an error report. In either case, the modular sorting assembly 500 can return temporarily stored items from the auxiliary container 562 to the inbound containers 554 after the sorting operation is completed.

FIG. 15 shows the modular sorting station 500 of FIG. 14 in a side view, in which like parts have like numbering. In particular, FIG. 15 shows orthogonally oriented rails 542 which facilitate horizontal movement in two dimensions by the robotic graspers 532. Multiple robotic graspers 532 are shown, each capable of operating independently to sort items from inbound containers 554 to outbound containers 560. In at least one embodiment, the multiple robotic graspers 532 can partially overlap in range to allow the robotic grasping assembly 504 to access items in adjacent containers or items in the same container, such as closely spaced items in bulk containers. Although the modular sorting station 500 is shown in conjunction with inventory holders 552, 558 having individual containers on horizontal stages, the modular sorting station can also work with alternative forms of inventory holders, such as bulk containers, pallets, or the like. In various embodiments, the modular sorting station 500 can include at least one grasper 532, or at least two graspers. In one embodiment, as shown, the modular sorting station 500 includes three graspers 532, each operable to transit in a 2D space above the inbound and outbound bays 550, 556.

FIG. 15 also shows the auxiliary container 562 connected with, and suspended from, the frame 502 at legs 508 via supports 564. The auxiliary container 562 is connected with the frame 502 and movable with the frame, or can be disconnected and moved separately. In one embodiment, the auxiliary container is raised to allow drive units 20 and/or drive units with inventory holders 558, 552 to pass underneath the auxiliary container.

Figure 16:
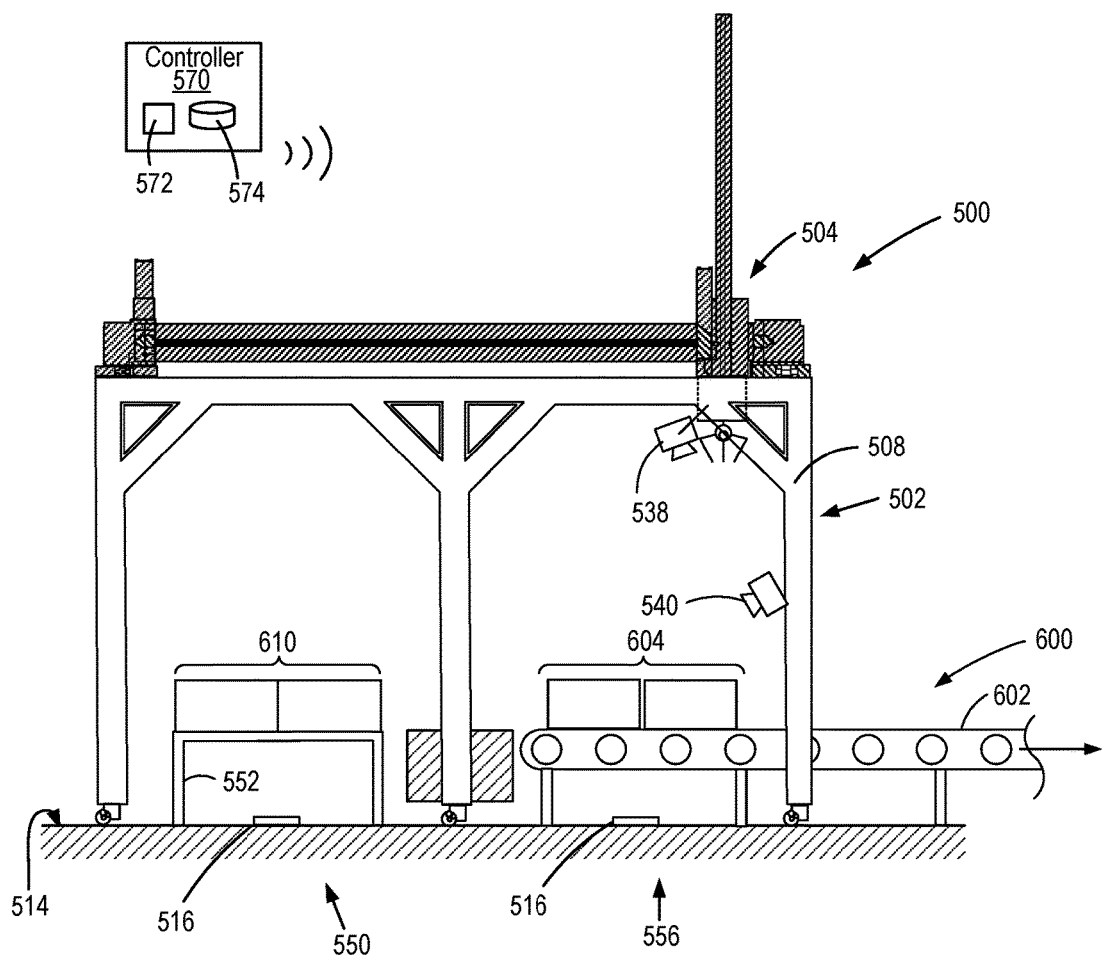
FIG. 16 shows a secondary modular sorting station in a side view, including an outbound conveyance, in accordance with at least one embodiment.

As discussed above with reference to modular sorting stations 214, 222, (FIG. 1) the modular sorting station 500 can be applied as a secondary modular sorting station by co-locating the modular sorting station with a conveyance for transferring inventory items. For example, FIG. 16 shows an example of the modular sorting station 500 in conjunction with an outbound conveyance mechanism 600, in accordance with at least one embodiment. Here, the modular sorting station 500 is positioned with an inbound bay 550 aligned with a fiducial marking 516, and the outbound bay 556 aligned with the conveyance mechanism 600. The conveyance mechanism 600 can include any suitable mechanism for moving inventory items for further processing, e.g. a chute, conveyor, shuttle, or similar mechanism. As shown, the conveyance mechanism 600 includes a conveyer belt 602, which terminates within the outbound bay 556. In one embodiment, the conveyance mechanism 600 is also aligned with a fiducial marking 516 that is used to position the modular sorting station 500.

In operation, the modular sorting station 500 receives an inbound inventory holder 552 at the inbound bay 550, e.g. via a drive unit such as drive unit 20 (FIGS. 1-13), which is placed in alignment with the modular sorting station and a designated fiducial marking 516. In one embodiment, the inbound inventory holder 552 includes sorted, inbound inventory containers 610 that have already been sorted from storage bins by an initial modular sorting station (FIGS. 14-15). Under the control of controller 570, the modular sorting assembly 500 can scan the inbound bay 550, including any inbound containers 610, for inventory items matching a requested inventory item. For pre-sorted containers, the modular sorting assembly 500 can grasp any inventory item present in the containers 610, identify the inventory item via the scanners 538, 540, and transfer the inventory item to the conveyor 602. In one embodiment, the conveyance mechanism 600 can include multiple outbound containers 604 which are routed to the same or to different locations, e.g., one outbound container may contain items for a particular customer, or items for transport to a particular location. In another embodiment, the conveyance mechanism 600 can receive individual items thereon for transfer.

Figure 17:
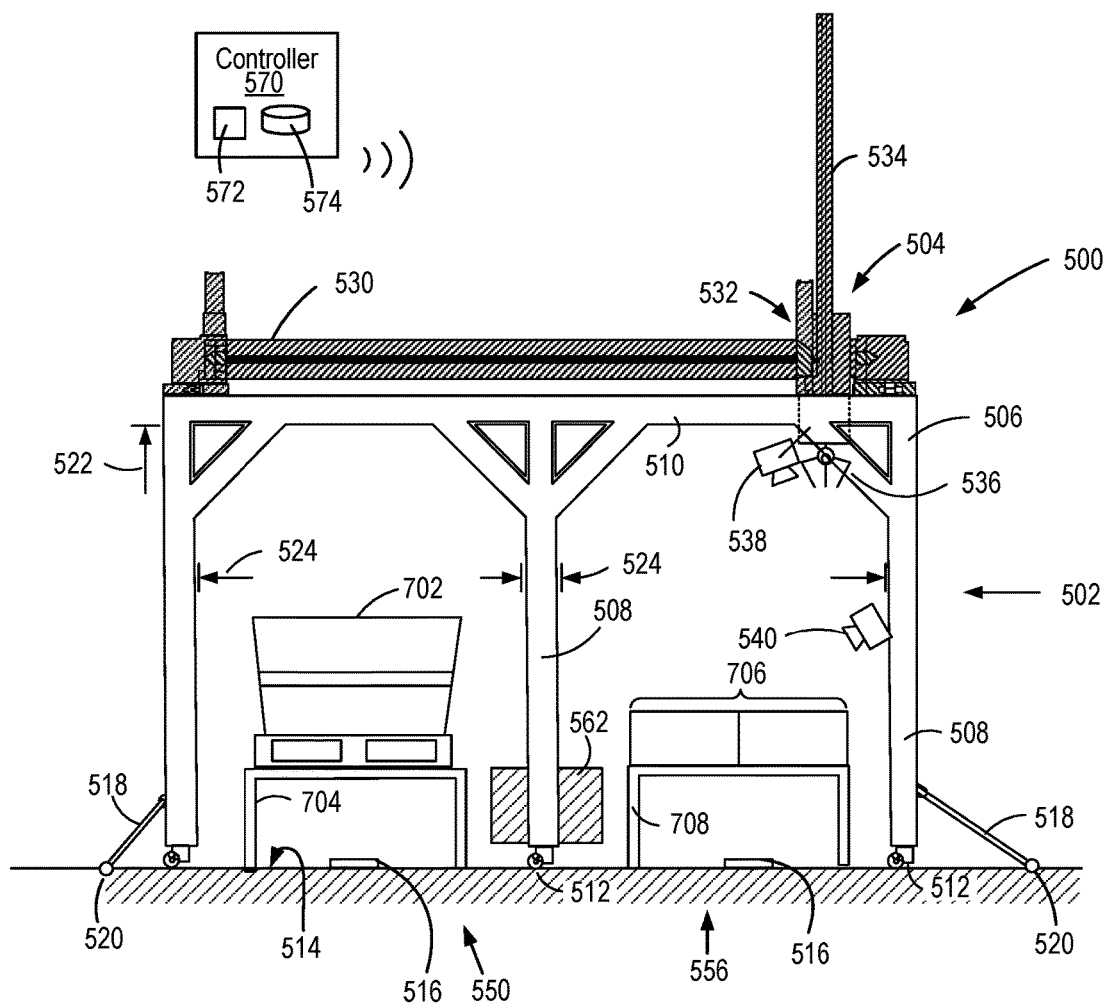
FIG. 17 shows a tertiary modular sorting station in a side view, including an inbound bulk storage container, in accordance with at least one embodiment.

The modular sorting station 500 can also be applied as a tertiary modular sorting station for sorting new items from bulk containers or other inbound conveyances and placing them in storage containers. For example, FIG. 17 shows an example of the modular sorting station 500 in conjunction with an inbound bulk container 702 in accordance with an embodiment. The bulk container 702 can be carried and placed on an inventory holder 704, such that it can be compatible with a drive unit as shown; or alternatively, can be positioned in the inbound bay 550 of the modular sorting station, either manually or by way of automated elements other than drive units. Under the control of the controller 570, the modular sorting assembly 500 can scan the inbound bay 550, locate an item in the inbound bulk container 702, and transfer the item from the inbound bulk container to an appropriate storage container 706, which will be positioned on another inventory holder 708 for transit within the inventory system. The selection of the inbound item and the appropriate storage container may be carried out by the controller 570 based, e.g., on sensed information about the inbound item or storage container. In some cases, the inbound items may be the same or selected from a known selection of items that have been delivered as a bulk shipment or that have been transshipped from a different inventory system. Thus, under some conditions, the modular sorting station 500 can be used to replace the apparatuses of a conventional induct station, like induct station 206. A tertiary modular sorting station can be used for transferring items to storage containers when those items have already been previously inducted, or when a large number of similar items are received in a bulk storage container.

Figure 18:
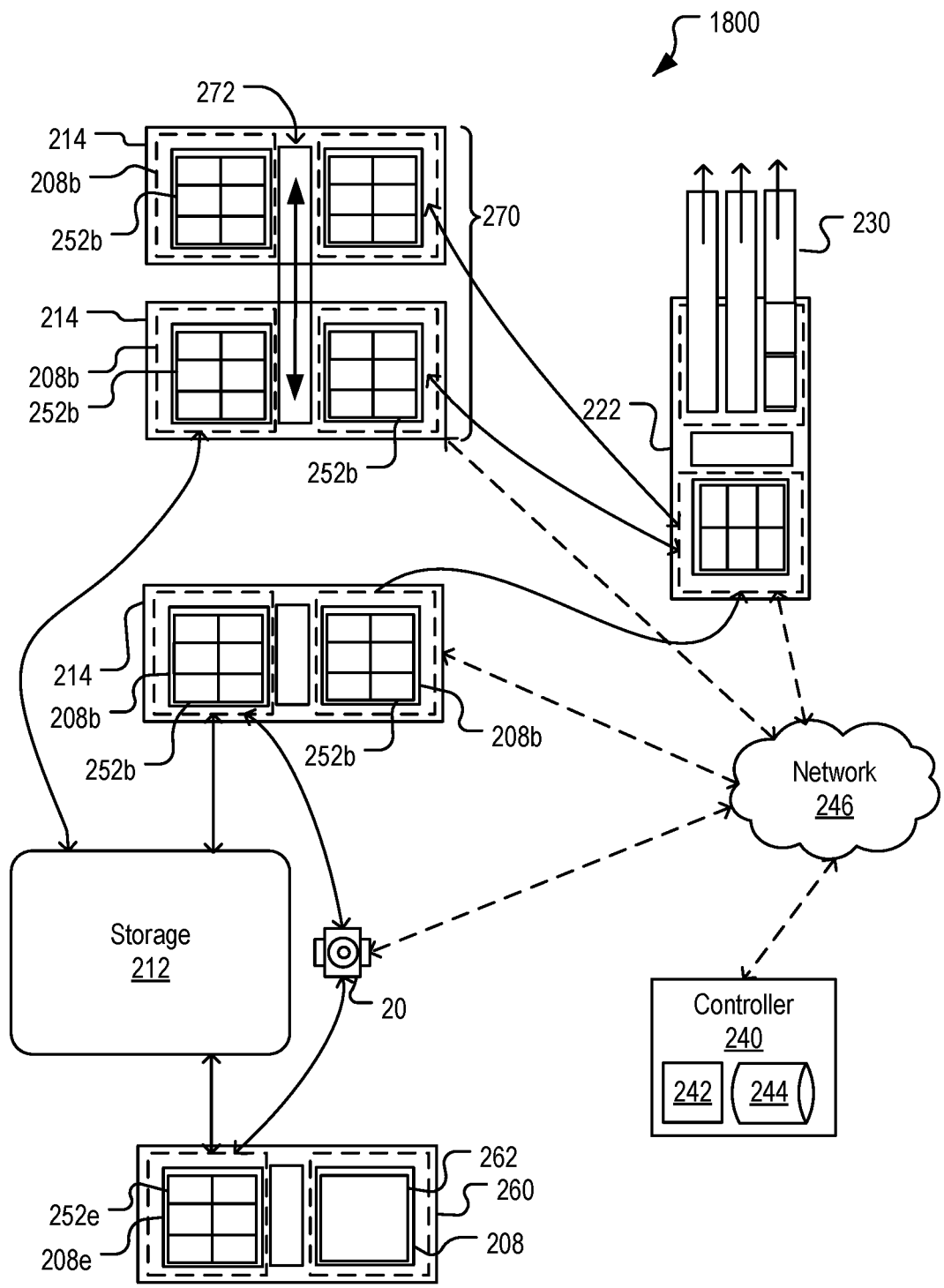
FIG. 18 illustrates a second example of an inventory system similar to the inventory system of FIG. 1, in accordance with one embodiment.

In one embodiment, the modular sorting station 500 can use used as a standalone sorting system, omitting the initial sorting phase. However, in other embodiments, multiple modular sorting stations 500 are preferably used in conjunction with each other to accomplish a two-step sorting process, e.g., as initial sorting station 214 (FIG. 1) and secondary sorting station 222 (FIG. 1). FIG. 18 illustrates a second example of an inventory system 1800 similar to the inventory system 200 of FIG. 1, in accordance with one embodiment, utilizing multiple initial sorting station 214 in conjunction with a secondary sorting station 222.

As shown in FIG. 18, the initial modular sorting station 214 can be placed in proximity to a storage region 212, i.e. a bay of the workspace dedicated to storing inventory items. Under the control of the controller 240, inventory containers 252b positioned on inventory holders 208b can be retrieved from storage 212, e.g. by drive units 20, and processed by the initial modular sorting station 214. Select inventory items, as they are removed from the storage containers 252b, are transferred to outbound containers 252c on outbound inventory holders 208b. Because the initial sort may require scanning multiple items and potentially performing multiple scans, the initial sort may take significantly longer than a secondary sort.

A secondary modular sorting stations 222 is positioned proximate to the initial modular sorting stations 214 to receive sorted inventory items that have passed through one or the other of the initial modular sorting stations. Depending on the relative speed of sorting that occurs at the initial modular sorting station 214, the ratio of the number of secondary modular sorting stations to initial modular sorting stations can vary. In one embodiment, the ratio of initial to secondary modular sorting stations 222, 214 can be configured based on the relative speed of sortation at each type of the modular sorting stations, e.g., 2:1, 3:2, 4:3, 3:1, 4:1, 6:1, or other ratio.

Functionally, a desired ratio of initial to secondary modular sorting stations 222, 214 can be based on an average number of steps required to sort an item at each such station. For example, items at secondary modular sorting stations are typically placed in containers alone or are at least clearly visible, and are thus retrieved quickly. However, items at an initial modular sorting station may be stacked in multiple layers, thus requiring searching below a top layer of items to locate the desired item. The average number of items that must be removed from an inventory container before the desired item is found can vary, and depends in part on a typical number of layers in each container.

In some embodiments, multiple (i.e., two or more) sorting stations 214, 222 can be co-located with automated means of passing inventory items between the stations. For example, a station pair 270 is shown made up of two sorting stations 214, which are linked by a linking conveyance 272. The linking conveyance 272 can include any suitable conveyor for transferring items between sorting stations, such as a conveyer belt, robotic grasper and/or gantry, platform, shuttle, or the like. In some cases, the linking conveyance 272 can share the role of an auxiliary container or buffer, like auxiliary container 562 (FIGS. 14-17), such that the inventory system 1800 can pass items placed into the linking conveyance and subsequently pass the items between sorting stations 214, 222. A linking conveyance 272 can be applied between any suitable number of sorting stations 214, 222, including initial, secondary, or tertiary stations.

In alternative embodiments, a tertiary modular sorting station 260 can be used to reload (i.e., top off) the containers 252 of any partially depleted inventory holder 208, e.g. after the containers have passed through the inbound bay of an initial modular sorting station 214. For example, in one embodiment, drive units 20 can route at least a subset of partially depleted inventory holders 208e from initial sorting (i.e. after depletion via the inbound bay of an initial modular sorting station) to an outbound bay of a tertiary modular sorting station 260. The tertiary modular sorting station 260 can access inventory items, e.g. from a bulk storage container 262 or other source, for refilling the partially depleted containers 252e of the inventory holder 208e. Inventory items accessed in this way can be deposited by the tertiary modular sorting station 260 into partially depleted containers 252e on a returning, partially depleted inventory holder 208e as it is returned via a drive unit 20 to storage 212.

Figure 19:
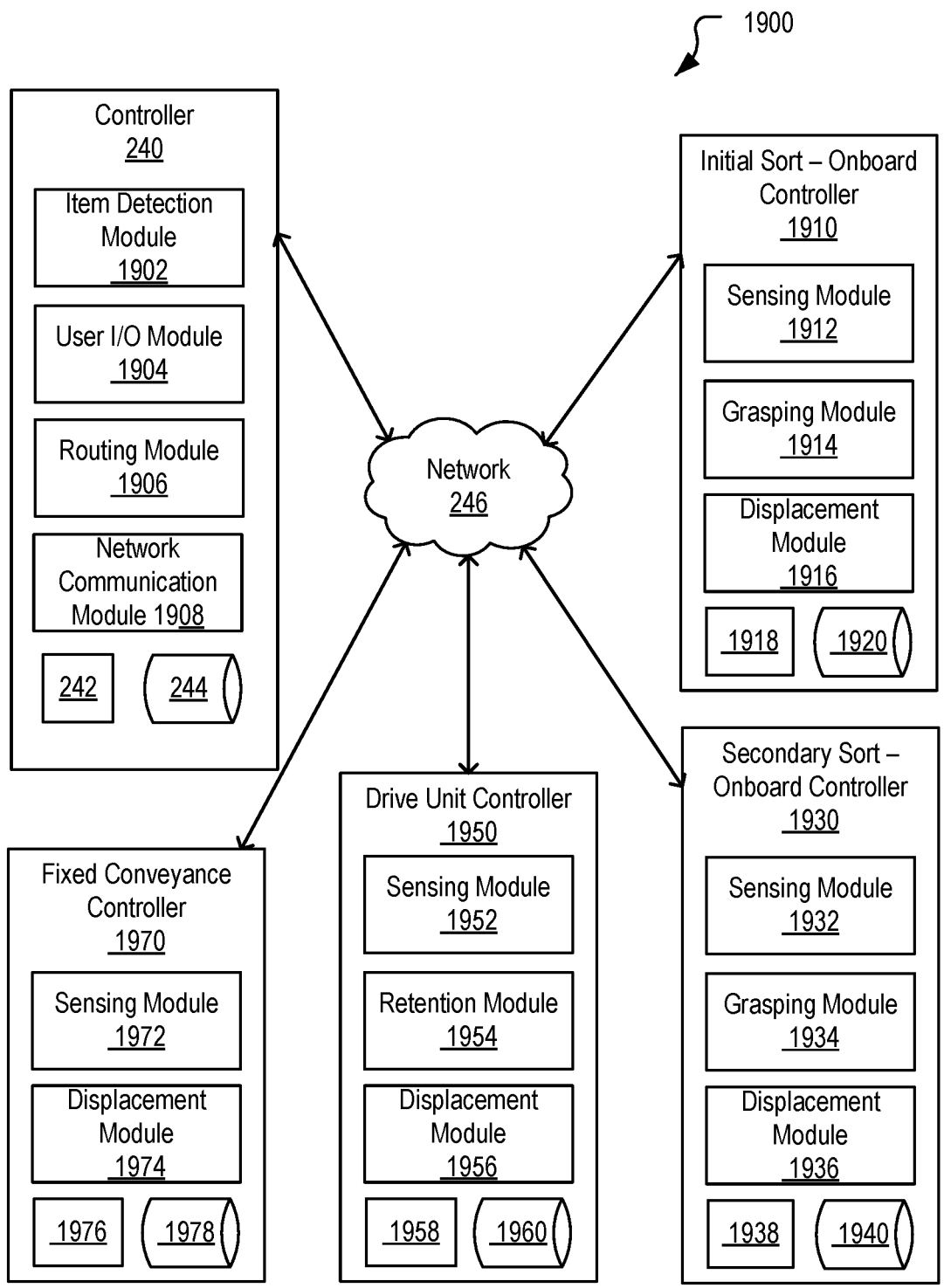
FIG. 19 illustrates an example system for controlling an inventory system like the inventory systems of FIGS. 1 and 17.

FIG. 19 illustrates a block diagram of an example system 1900 for controlling an inventory system like the inventory systems 200, 1800 of FIGS. 1 and 18, in accordance with embodiments. The system 1900 may be operable to control any suitable number of drive units 20 for transporting inventory holders 208 (FIGS. 1, 18), to control any suitable number of modular sorting stations (e.g., modular sorting stations 500, including initial modular sorting stations 214, secondary modular sorting stations 222, and tertiary modular sorting stations 260), as well as other system elements.

For example, the system 1900 includes a controller 240, similar to controller 240 as described with reference to FIGS. 1 and 18, including a processing module 242 and memory 244 operable to maintain any or all of, or any suitable combination of the following modules: an item identification module 1902, a user I/O module 1904, a routing module 1906, and a network communication module 1908. Any or all of said modules may be configured to enable automated or semiautonomous actions by the drive units 20 and/or modular sorting stations 500, 214, 216, 260 described above. The system 1900 can also include an onboard controller for each initial modular sorting station 1910, for each secondary modular sorting station 1930, a local drive unit controller 1950 for controlling operation of each drive unit, and a fixed conveyance controller 1970 for controlling operation of each conveyer associated with the secondary modular sorting stations.

The controller 240 can include a computer system configured to receive instructions via a network 246 and cause drive units, modular sorting stations, and other robotic elements to act in accordance with those instructions. For example, the item detection module 1902 can receive sensor data from one or more of the modular sorting stations' onboard controllers and/or sensors and identify the item. The user I/O module can receive user input and generate outputs, e.g., the I/O module can include a switch, keyboard, screen, touchscreen, microphone, or any other suitable device for entering a user input or for displaying a visual or audible output. Data can include, for example, instructions from a user to pause operation of the system to enable installation of an additional modular sorting station, or to register a location of a new modular sorting station with the controller 240. Data can also include a status message, such as any suitable error message or status update. The routing module 1906 can direct pathfinding for drive units, can instruct drive units to retrieve or transport particular inventory holders from site to site within an inventory system, and can direct routing of select inventory items out of the inventory system. A network communication module 1908 can facilitate communication of instructions from the controller 240 to the various other components via the network 246, as well as the transfer of data from the various components back to the controller 240.

The onboard controller for the initial modular sorting stations 1910 can include a sensing module for 1912 for controlling the operation of one or more sensors associated with each modular sorting station for scanning inbound containers for requested items. In one embodiment, this data can be processed at the onboard controller 1910, e.g. by an onboard processor 1918 and memory 1920; or can be communicated with the controller 240. A grasping module 1914 can control actuation of the robotic grasping assembly of each modular sorting station, i.e., causing the grasping assembly to retrieve detected inventory items, while a displacement module 1918 can control movement of the grasping assembly with respect to the gantry rails 530, 542 to displace inventory items from inbound containers to outbound containers.

The onboard controller for the secondary modular sorting stations 1930 can include a sensing module for 1932 for controlling the operation of one or more sensors associated with each modular sorting station for scanning inbound containers for requested items. In one embodiment, this data can be processed at the onboard controller 1930, e.g. by an onboard processor 1938 and memory 1940; or can be communicated with the controller 240 and processed by the item detection module 1902. A grasping module 1934 can control actuation of the robotic grasping assembly of each secondary modular sorting station, i.e., causing the grasping assembly to retrieve detected inventory items, while a displacement module 1938 can control movement of the grasping assembly with respect to the gantry rails 530, 542 to displace inventory items from inbound containers to either outbound containers or fixed conveyances associated with the secondary modular sorting stations.

The drive unit controller 1950 can include at least the following components and subsystems. A sensing module 1952 can detect the local position of each drive unit, e.g. by way of fiducial markings with respect to a workstation floor, with respect to the modular sorting stations, or both. A retention module 1950 can cause drive unit to engage or disengage from an inventory holder in order to lift, transport, and deposit inventory holders in the inventory system. A displacement module can respond to routing instructions form the routing module 1906 by causing the drive unit to move within the inventory system according to the routing instructions. In one embodiment, the drive unit controller can cause the drive unit to displace based on routing instructions from the controller 240, e.g. by calculating specific routes using onboard processing 1958 and memory 1960. In alternative embodiments, each drive unit can be directly controlled by the controller via the network 246.

The fixed conveyance controller 1970 can include a sensing module 1972 for detecting the presence of an inventory item thereon, and a displacement module for causing the fixed conveyance to physically move the inventory item as directed by the routing module 1906. In one embodiment, the fixed conveyance controller 1970 implements instructions from the controller 240 by way of an onboard processor 1976 and memory 1978.

Some or all of the processes 2000, 2100, 2200, 2300, or 2400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 20:
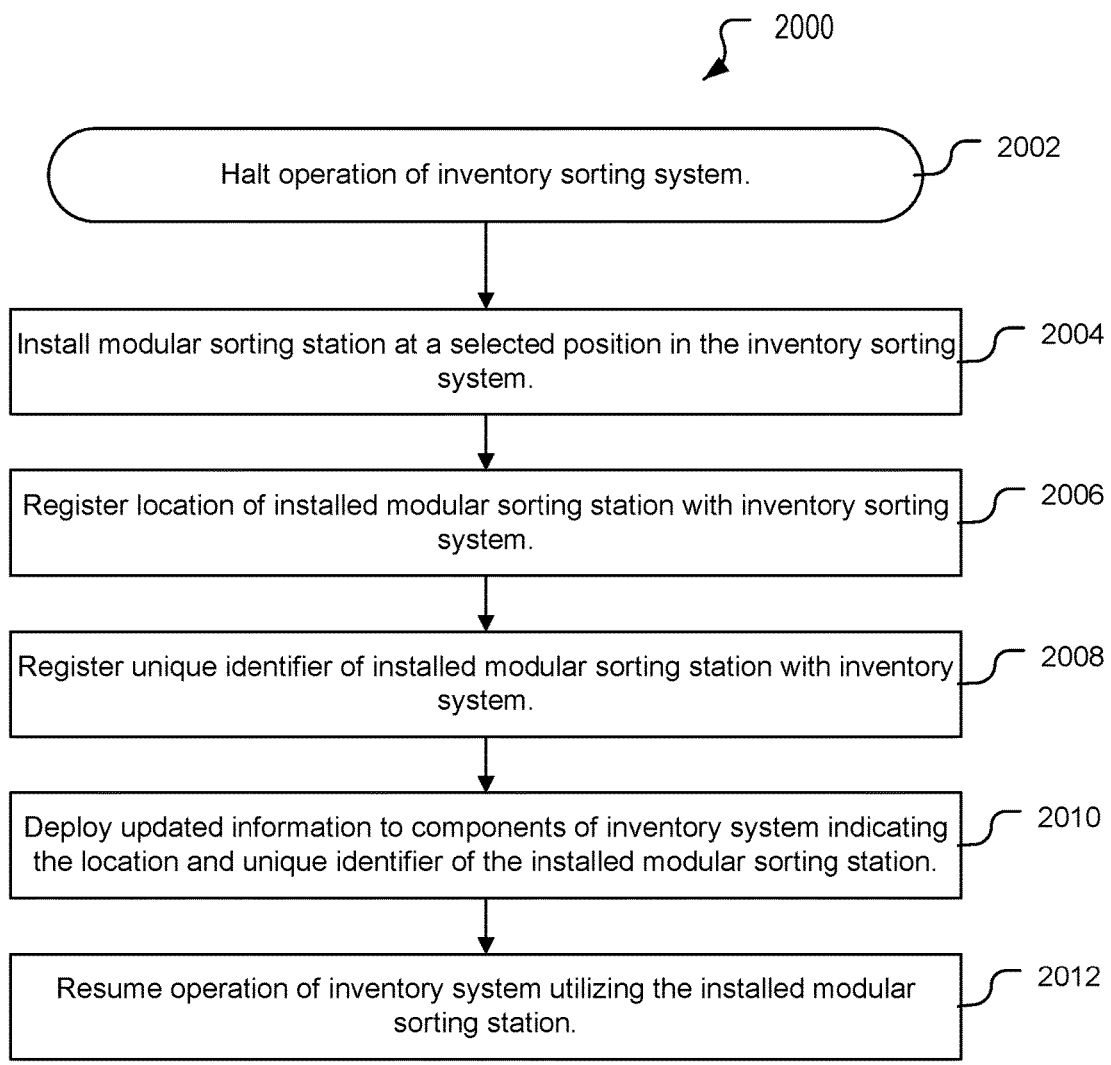
FIG. 20 illustrates an example process for configuring an inventory system with a modular sorting station like the sorting stations of FIGS. 14-16.

Techniques described herein include methods of configuring an inventory system with a modular sorting station. For example, FIG. 20 illustrates an example process 2000 for configuring an inventory system with a modular sorting station like the sorting stations of FIGS. 14-17. Aspects of the process 2000 may be performed, in some embodiments, by a similar system to the system 1900 discussed with reference to FIG. 19. The system may be implemented in an inventory system as described in FIG. 1 or 18, and in conjunction with modular sorting stations as described with reference to FIGS. 1 and 14-17.

In an embodiment, the process 2000 includes temporarily halting the operation of an inventory sorting system, e.g. by the receipt of a user command (act 2002). This pause can take effect over an entire workspace, or in a subset of a workspace associated with a selected destination for receiving a modular sorting station. The modular sorting station can then be transferred into the workspace and aligned in place at a selected position in the inventory sorting system (act 2004). This position is selected depending on the function of the specific modular sorting system installed; e.g., an initial modular sorting system may be installed near a storage region of the workspace, whereas a secondary modular sorting system may be installed near a periphery of the workspace, or near a position of a fixed conveyance that enters or approaches the workspace. During the installation process, the modular sorting station is fixed in position to the workspace floor, as discussed above. Once installed, the position of the modular sorting station is registered with an inventory sorting system, i.e., the modular sorting station is associated with one or more fiducial markings indicating the position of the modular sorting station in the workspace (act 2006), and a unique identifier associated with the modular sorting station is registered with a workspace controller (act 2008). Once the modular sorting station is registered, the system can update a virtual representation of the workspace to include the added modular sorting station (act 2010). This registration allows the system to selectively route drive units containing inventory items to the modular sorting station as needed to perform inventory sorting tasks; or allows the system to route drive units around the modular sorting station. In one embodiment, the unique identifier of the modular sorting station is associated with two adjacent fiducial markings in the workspace corresponding to adjacent grid positions in the virtual representation of the workspace, one of the grid positions being associated with the inbound bay of the modular sorting station, and the other of the grid positions being associated with the outbound bay of the modular sorting station. Once the modular sorting station is installed and registered with the system, the system can resume normal operation now utilizing the modular sorting station (act 2012). The modularity of the sorting stations allow for rapid deployment of new modular sorting stations as needed, e.g., by deploying additional stations during high volume periods, moving stations to accommodate changes or obstructions to drive unit workflow, or other situational needs.

Figure 21:
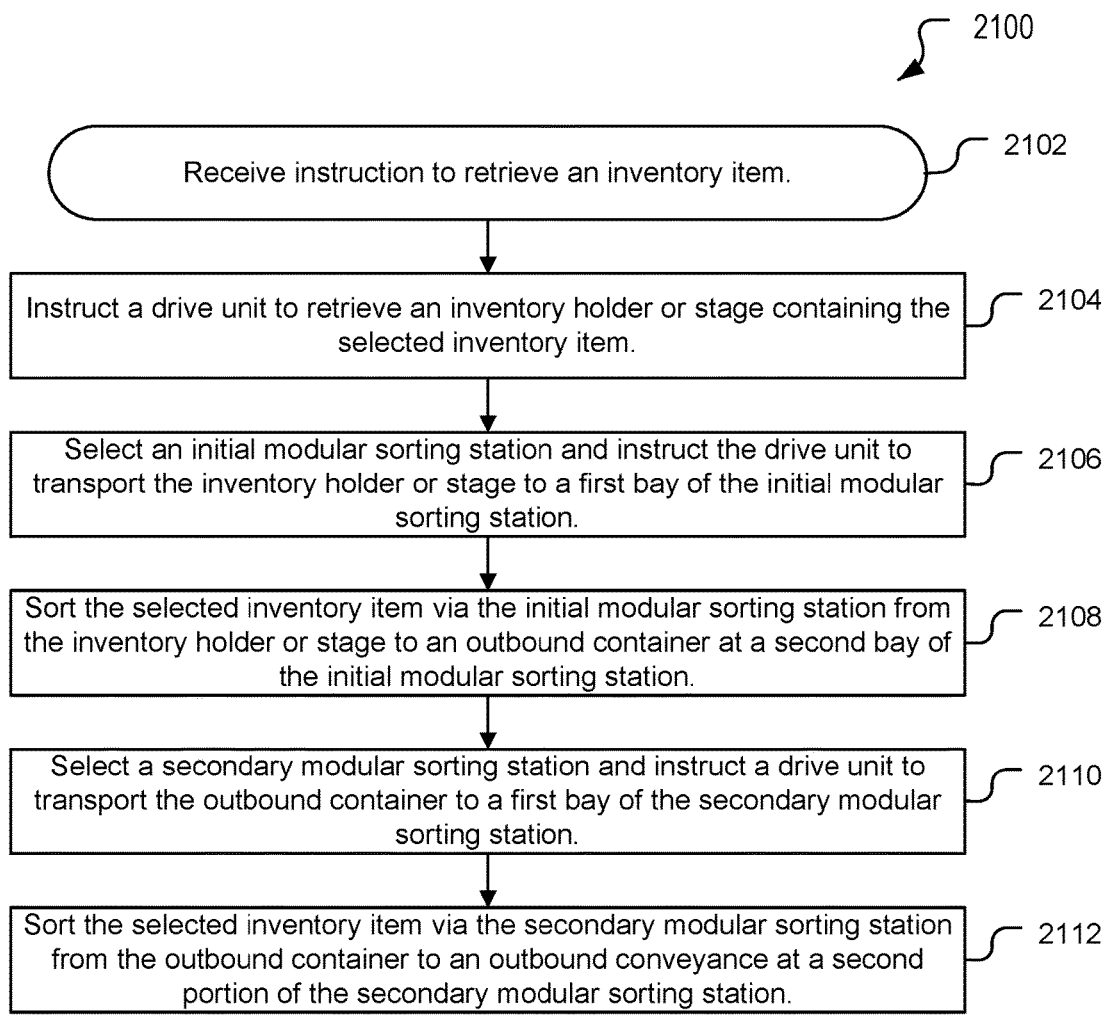
FIG. 21 illustrates an example process for sorting inventory using an inventory system like those shown in FIGS. 1 and 17.

Techniques described herein also include methods of sorting inventory using a modular sorting station. For example, FIG. 21 illustrates an example process 2100 for sorting inventory using an inventory system like systems 200 or 1800 as shown in FIGS. 1 and 18. Aspects of the process 2100 may be performed, in some embodiments, by a similar system to the system 1900 discussed with reference to FIG. 19. The system may be implemented in an inventory system as described in FIG. 1 or 18, and in conjunction with modular sorting stations as described with reference to FIGS. 1 and 14-17.

In an embodiment, the process 2100 includes receiving instructions to retrieve an inventory item from storage (act 2102). The system instructs a drive unit to retrieve a container, or an inventory holder holding a container, that contains the selected inventory item (act 2104). In some cases, further automated systems involved in the storage of items may selectively remove a container from storage, e.g. high-density storage shelves or the like, and place the container on an inventory holder for transport by the drive unit. Multiple containers, each containing an individual requested item, may be transferred to an inventory holder in this way.

The system can then select an initial modular sorting station for performing an initial sort of the container(s) for the inventory item(s), and instruct the drive unit to move to the inbound bay of that initial modular sorting station (act 2106). The system may select the initial modular sorting station from multiple sorting stations based on a distance between the requisitioned drive unit and the modular sorting stations, or based on a cost to transit the drive unit to the modular sorting stations (i.e., any suitable combination of distance, time delays, obstructions, and any queue for use of the modular sorting station). When the system has selected a modular sorting station, it can instruct the drive unit to move to the inbound bay at the selected initial modular sorting station.

The initial modular sorting station can then sort the item(s) from the container(s) on the inventory holder and transfer the item(s) to an outbound, or sorted, container at a second bay of the initial modular sorting station (act 2108). In embodiments where the modular sorting stations have multiple grasping elements and the inventory holder holds multiple containers with requested inventory items, this step can include the parallel operation of several sensors scanning containers for the requested items, and several grasping elements moving requested inventory items into designated outbound containers, simultaneously. In one embodiment, the outbound bay of the initial sorting station contains a second inventory holder, which has thereon a number of outbound containers equal to the number of containers that have been pulled from storage, so that the modular sorting station moves items from inbound container to outbound container on a one-to-one basis.

Next, the system can select a secondary modular sorting station for further processing of the sorted inventory items, and instruct a drive unit, which may be the same as the initial drive unit or may be a different drive unit, to transfer the outbound inventory holder from the second bay of the initial modular sorting station to an inbound bay of a secondary modular sorting station (act 2110). As with the initial modular sorting station, this secondary modular sorting station may be selected based on a combination of factors. For example, the system may select the secondary modular sorting station based on a proximity to the initial station, based on the availability of a particular outbound conveyance at the secondary station, a cost to transit to each secondary modular sorting station that is available, or a combination of these factors. The system can then instruct the secondary modular sorting station to sort items from the outbound containers of the second inventory holder to selected outbound conveyances (act 2112). In one embodiment, the secondary sort can include placing the outbound items on a fixed conveyance, such as a chute, shuttle, conveyor belt, or the like that has a particular destination (e.g., to outbound shipping, for transfer between inventory systems, etc.). In another embodiment, the secondary sort can include placing the outbound items into a bulk container, which may be carried by a drive unit. In another embodiment, the secondary sort can perform organizational tasks, such as placing items into new containers, or revising the contents of containers, for return into storage.

Figure 22:
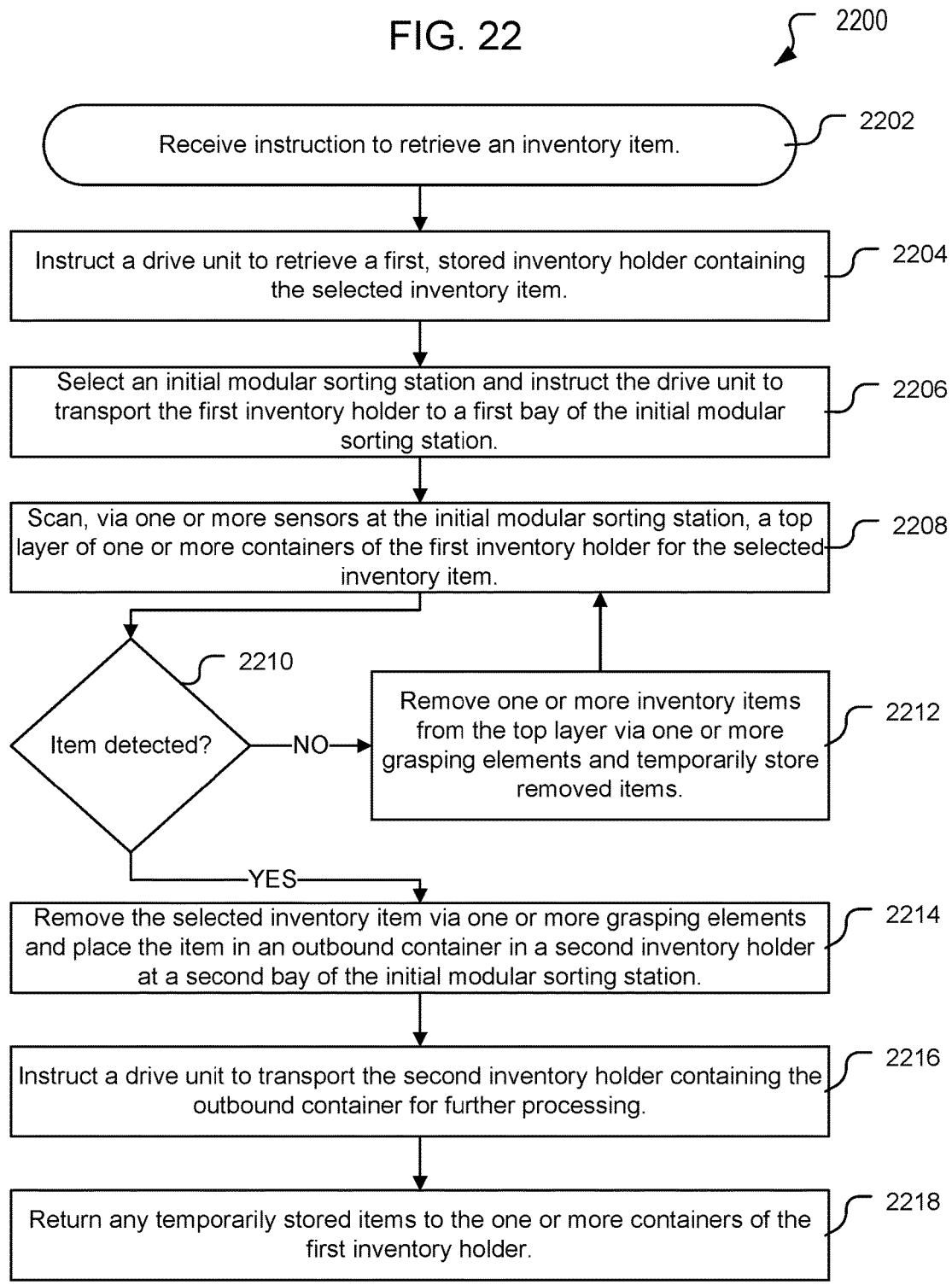
FIG. 22 illustrates a second example process for sorting inventory.
Figure 23:
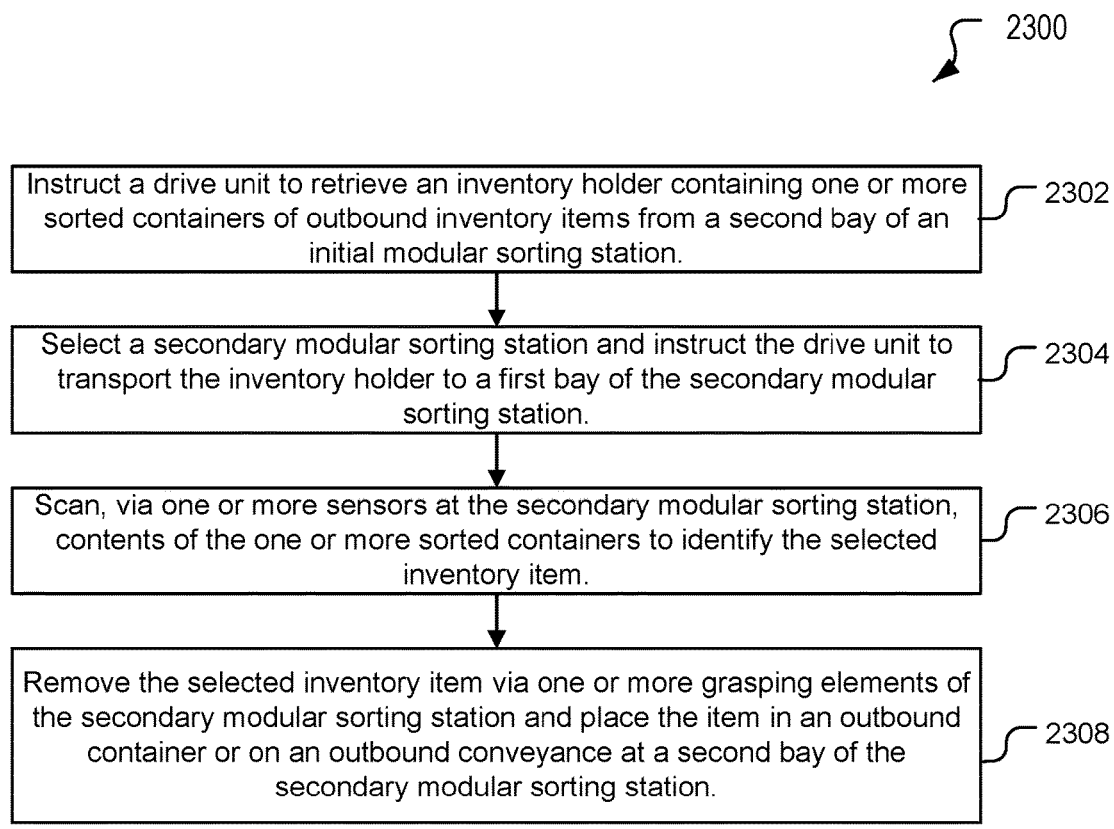
FIG. 23 illustrates a third example process for sorting inventory.

Complex inventory sorting tasks may be performed where inventory containers contain multiple layers of inventory items, as described with reference to FIGS. 22-23. FIGS. 22-23 illustrate second and third example processes 2200 and 2300 for sorting inventory by performing an initial sort using a modular sorting station in an inventory system like systems 200 or 1800 as shown in FIGS. 1 and 18. Aspects of the processes 2200 and 2300 may be performed, in some embodiments, by a similar system to the system 1900 discussed with reference to FIG. 19. Processes 2200 and 2300 may be implemented individually, or may be implemented together in series with process 2200 preceding process 2300. The system may be implemented in an inventory system as described in FIG. 1 or 18, and in conjunction with modular sorting stations as described with reference to FIGS. 1 and 14-17.

In an embodiment, process 2200 includes receiving instructions to retrieve one or more inventory items from storage (act 2202). The system instructs a drive unit to retrieve a container, an inventory holder holding a container, or a set of multiple containers that contains the selected inventory item or items, as described above with respect to FIG. 21 (act 2204). The system can then select an initial modular sorting station for performing an initial sort of the container(s) for the inventory item(s), and instruct the drive unit to move to the inbound bay of that initial modular sorting station (act 2206).

The initial modular sorting station can then begin an initial sort of the item(s) from the container(s) on the inventory holder by scanning, via sensors connected with the modular sorting station, a top layer of each inbound container (act 2208). Often, items may be layered several layers deep in a container, and may not be visible on a first pass. If the item is not detected (act 2210), the initial modular sorting station removes one or more inventory items, or a layer of inventory items, from the container and places the removed items in an auxiliary container for temporary storage (act 2212). The system can then repeat the step of scanning a top layer for the inventory items, and repeatedly remove items for temporary storage as needed, until the item is detected. As described above with reference to FIG. 21, these detection and sorting tasks can be performed in parallel by multiple scanners and grasping elements associated with each modular sorting station.

When the selected inventory item has been detected, the system retrieves the inventory item from the inbound container via a grasping element, and places the item in an outbound container at an outbound bay of the initial sorting station (act 2214). This act can also occur in parallel across multiple inbound and outbound containers. In one embodiment, the outbound bay of the initial sorting station contains a second inventory holder, which has thereon a number of outbound containers equal to the number of containers that have been pulled from storage, so that the modular sorting station moves items from inbound container to outbound container on a one-to-one basis.

Next, the system can select a secondary modular sorting station for further processing of the sorted inventory items, e.g., the system can instruct a drive unit, which may be the same as the initial drive unit or may be a different drive unit, to transfer the outbound inventory holder from the second bay of the initial modular sorting station to an inbound bay of a secondary modular sorting station (act 2216). The system can then instruct the initial modular sorting station to return any temporarily stored items from the auxiliary storage container back to the inbound containers from which they were removed during the sorting process.

FIG. 23 describes further processing steps of process 2300, which can be applied following the process 2200, described above. In an embodiment, the system can instruct a drive unit to retrieve an inventory holder from an outbound bay of an initial sorting system (act 2302), and transfer the inventory holder containing sorted inventory containers to an inbound bay of a secondary modular sorting station (act 2304). The secondary modular sorting station can scan the containers containing the sorted inventory items, e.g. via one or more sensors at the secondary modular sorting station, to identify the inventory items therein (act 2306). The system can then direct the secondary modular sorting station to transfer the inventory items to appropriate outbound conveyances or containers, e.g. for combination into one or more containers for shipment to various final destinations, or transfer to a chute, conveyor, shuttle, or the like (act 2308).

Figure 24:
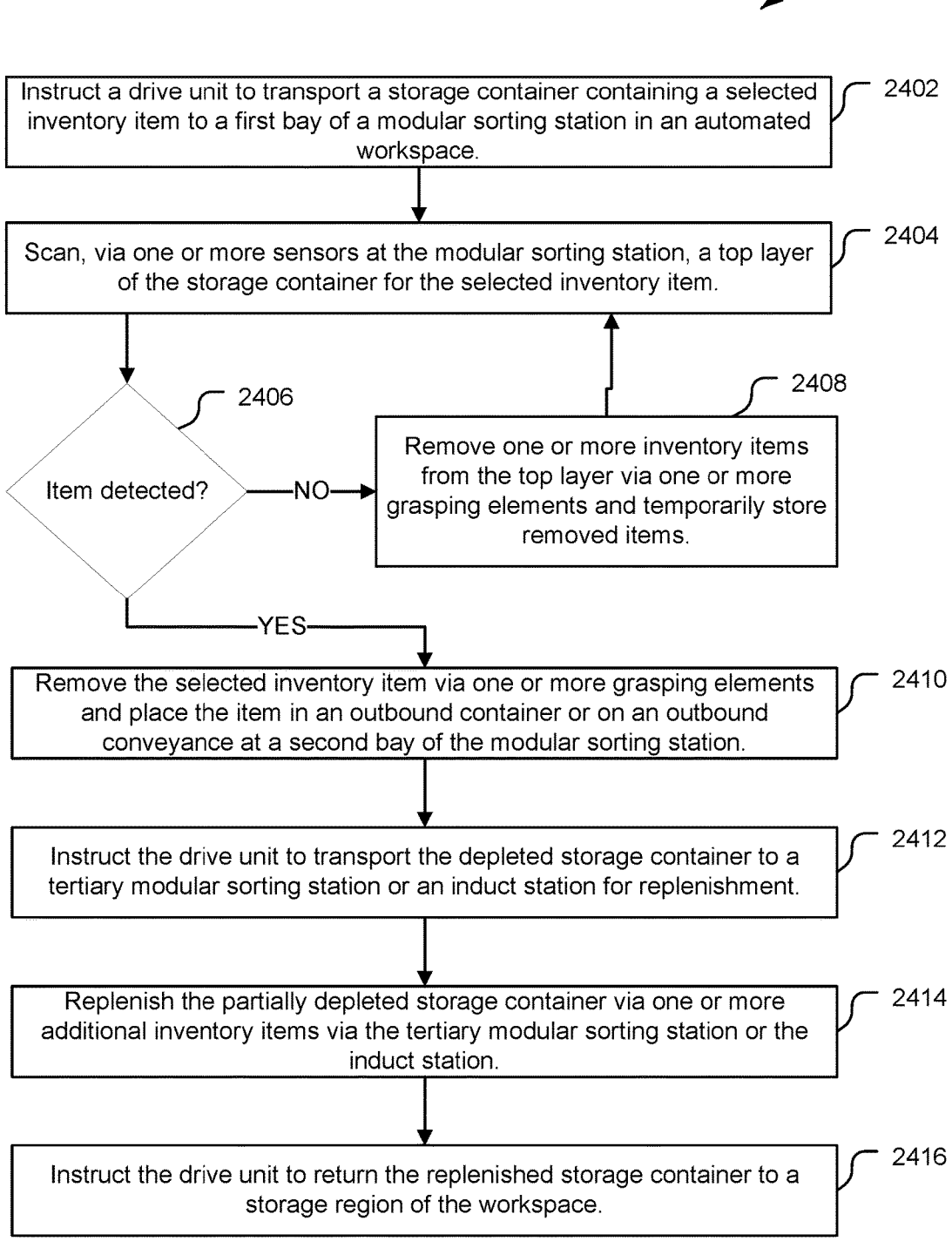
FIG. 24 illustrates a fourth example process for sorting inventory.

FIG. 24 illustrates a fourth example process 2400 for sorting inventory by performing a complete sort using a modular sorting station in an inventory system like systems 200 or 1700 as shown in FIGS. 1 and 18. Aspects of the process 2400 may be performed, in some embodiments, by a similar system to the system 1900 discussed with reference to FIG. 19. The system may be implemented in an inventory system as described in FIG. 1 or 18, and in conjunction with modular sorting stations as described with reference to FIGS. 1 and 14-18.

In an embodiment, the process 2400 includes the system instructing a drive unit to retrieve one or more requested inventory items from storage by transporting one or more storage containers containing the requested inventory items to an inbound bay of a modular sorting station (act 2402). The modular sorting station can then begin a complete sort from the container(s) by scanning, via sensors connected with the modular sorting station, a top layer of each inbound container (act 2404). Often, items may be layered several layers deep in a container, and may not be visible on a first pass. If the item is not detected (act 2406), the initial modular sorting station removes one or more inventory items, or a layer of inventory items, from the container and places the removed items in an auxiliary container for temporary storage (act 2408). The system can then repeat the step of scanning a top layer for the inventory items, and repeatedly remove items for temporary storage as needed, until the item is detected. As described above with reference to FIGS. 21-22, these detection and sorting tasks can be performed in parallel by multiple scanners and grasping elements associated with each modular sorting station. The system can also instruct the modular sorting station to return any temporarily stored items from the auxiliary storage container back to the inbound containers from which they were removed during the sorting process.

When the selected inventory item has been detected, the system retrieves the inventory item from the inbound container via a grasping element, and places the item in an outbound container or on an outbound conveyance, e.g. for combination into one or more containers for shipment to various final destinations, or transfer to a chute, conveyor, shuttle, or the like for transport to outbound packaging and shipping, transshipment, or even back to storage (act 2410).

In one embodiment, the system can direct the drive unit carrying the storage container or containers to a tertiary modular sorting station or replenishment station for refilling depleted storage containers with new items (act 2412). In an embodiment, the system can track the number of items removed from each container, and instruct the tertiary modular sorting station to replace removed items on a one-to-one basis to replenish the storage containers (act 2414). In some embodiments, the tertiary modular sorting station can transfer items from, e.g., a bulk storage container to the partially depleted storage containers. The system may alternatively route the drive unit carrying the storage container or containers to an induct station, where new items entering the workspace are processed, for receiving items therefrom. Once the storage containers are replenished, the system instructs the drive unit to return the replenished storage container to storage.

Figure 25:
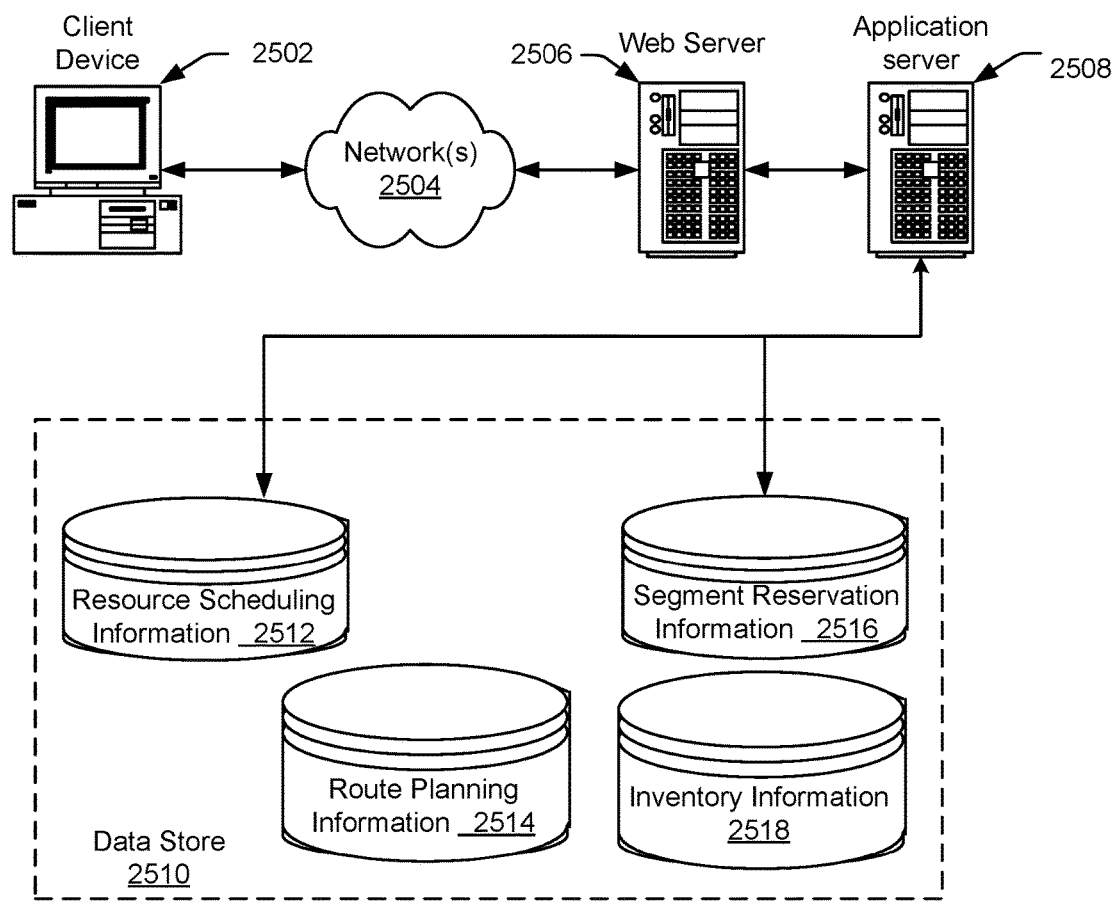
FIG. 25 illustrates an environment in which various embodiments can be implemented.

FIG. 25 illustrates aspects of an example environment 2500 for implementing aspects in accordance with various embodiments. As will be appreciated, although a Web-based environment is used for purposes of explanation, different environments may be used, as appropriate, to implement various embodiments. The environment includes an electronic client device 2502, which can include any appropriate device operable to send and receive requests, messages, or information over an appropriate network 2504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2506 for receiving requests and serving content in response thereto, although for other networks an alternative device serving a similar purpose could be used as would be apparent to one of ordinary skill in the art.

The illustrative environment includes at least one application server 2508 and a data store 2510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2502 and the application server 2508, can be handled by the Web server. It should be understood that the Web and application servers are not required and are merely example components, as structured code discussed herein can be executed on any appropriate device or host machine as discussed elsewhere herein.

The data store 2510 can include several separate data tables, databases or other data storage mechanisms and media for storing data relating to a particular aspect. For example, the data store illustrated includes mechanisms for storing information which can be used by modules described herein, such as resource scheduling information 2512, route planning information 2514, segment reservation information 2516, and/or inventory information 2518. It should be understood that there can be many other aspects that may need to be stored in the data store, such as for page image information and to access right information, which can be stored in any of the above listed mechanisms as appropriate or in additional mechanisms in the data store 2510. The data store 2510 is operable, through logic associated therewith, to receive instructions from the application server 2508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 25. Thus, the depiction of the system 2500 in FIG. 25 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   a workspace;
   a plurality of drive units operable to navigate the workspace; and
   a plurality of inventory holders capable of supporting inventory thereon and capable of being transported by the one or more drive units;
   a drive unit-navigable grid in the workspace and defining areas where the drive units can navigate;
   a modular sorting station comprising:
      a frame defining a first inbound bay and a first outbound bay, wherein each bay is sized to accommodate a drive unit of the one or more drive units with a supported inventory holder containing inventory, and wherein each bay is aligned with the drive unit-navigable grid;
      a sensor connected with the modular sorting station and operable to identify the inventory;
      a unique identifier associated with the modular sorting station; and
      a robotic grasper operable to grasp inventory from the inbound bay and release the inventory at the outbound bay; wherein the robotic grasper further comprises at least two robotic arms mounted to respective gantries above the inbound and outbound bays defined by the frame and
      a management component configured with executable instructions, in order to, at least:
         maintain a virtual representation of the workspace including a first grid position associated with the unique identifier of the modular sorting station;
         receive information relating to an inventory item in the inventory system;
         instruct a first drive unit of the one or more drive units to retrieve a first inventory holder containing the inventory item;
         instruct the first drive unit to transport the first inventory holder to the inbound bay of the modular sorting station based on the grid position associated with the unique identifier of the modular sorting station;
         sense, via the sensor, the inventory item in the first inventory holder; and
         cause the robotic grasper to move the inventory item from the first inventory holder to the outbound bay of the modular sorting station.

2. The system of claim 1, wherein the modular sorting station is an initial modular sorting station, and further comprising:
   a secondary modular sorting station, comprising:
      a second frame defining a second inbound bay and a second outbound bay;
      a second sensor connected with the secondary modular sorting station and operable to detect the inventory when the inventory is positioned in the second inbound bay;
      a second unique identifier associated with the secondary modular sorting station and a second robotic grasper operable to grasp inventory from the second inbound bay and release the inventory at the second outbound bay;
   wherein the management component is further configured to:
      maintain the virtual representation of the workspace including a second grid position associated with the second unique identifier of the secondary modular sorting station;
      instruct a second drive unit of the plurality of drive units to transport a second inventory holder to the first outbound bay of the first modular sorting station based on the first grid position associated with the unique identifier of the modular sorting station before the robotic grasper moves the inventory item, such that the inventory item is received in the second inventory holder when the inventory item is moved to the first outbound bay;
      instruct the second drive unit to transport the second inventory holder containing the inventory item to the second inbound bay of the secondary modular sorting station based on the second grid position associated with the secondary modular sorting station;

sense, via the second sensor, the inventory item in the second inventory holder; and cause the second robotic grasper to move the inventory item from the second inventory holder to the second outbound bay of the secondary modular sorting station.

3. The system of claim 1, further comprising:

a conveyance positioned in the outbound bay of the frame and operable to transport items placed thereon, so that causing the robotic grasper to move the inventory item to the outbound bay causes the inventory item to be placed on the conveyance.

4. The system of claim 1, further comprising:

a second inventory holder positioned in the outbound bay of the frame and operable to connect with a drive unit of the one or more drive units, so that causing the robotic grasper to move the inventory item to the outbound bay causes the inventory item to be placed in the secondary inventory holder.

5. The system of claim 1, wherein the first inventory holder comprises:

a mobile stage comprising a platform and a plurality of supportive legs spaced apart to allow the drive unit to pass therebetween to pass under or to lift the first inventory holder; and a plurality of containers arrayed on the mobile stage and accessible from above.

6. A modular sorting station, comprising:

a frame defining an inbound bay and an outbound bay, each of the inbound and outbound bays being sized to receive an inventory holder containing inventory thereon;

a robotic grasper mounted to the frame and positioned above one of the inbound and outbound bays and operable to transfer inventory items from the inbound bay to the outbound bay; and a sensor mounted to one of the frame or robotic grasper and operable to identify inventory at the inbound bay when the inventory holder is present in the inbound bay; wherein:

the frame is arranged to align with a material handling grid and sized to permit a drive unit to transit into or out of the inbound bay while carrying the inventory holder from at least two directions along the material handling grid;

the frame is portable such that the modular sorting station can be moved as a modular unit; and the modular sorting station has a unique identifier suitable for association with a position in a drive unit-navigable grid in a virtual representation of a workspace, wherein the robotic grasper further comprises at least two robotic arms mounted to respective gantries above the inbound and outbound bays defined by the frame.

7. The modular sorting station of claim 6, further comprising an auxiliary container connected with the frame and positioned adjacent the inbound bay and configured for receiving inventory items from the robotic grasper.

8. The modular sorting station of claim 7, wherein the auxiliary container is supported by the frame above a level of the drive unit such that the drive unit can tunnel freely underneath the auxiliary container.

9. The modular sorting station of claim 7, wherein the auxiliary container comprises a linking conveyance element configured to transport inventory into or out of the modular sorting station.

10. The modular sorting station of claim 6, wherein the sensor comprises at least one optical sensor capable of reading identifying information from an inventory item in the inventory holder when the inventory holder is present in the inbound bay.

11. The modular sorting station of claim 6, wherein the robotic arms are arranged to operate across different segments of the inbound bay.

12. The modular sorting station of claim 6, wherein the frame comprises at least four legs positioned in a spaced apart manner and disconnected near ground level to at least a height associated with the drive unit when the drive unit is carrying the inventory holder, such that the drive unit can readily pass into or out of at least one of the inbound bay or the outbound bay of the frame while carrying the inventory holder.

13. The modular sorting station of claim 12, further comprising a plurality of wheels for facilitating the movement of the modular sorting station, and at least one securement feature for releasably immobilizing the modular sorting station.

* * * * *

UNITED STATES PATENT AND TRADEMARK OFFICE
CERTIFICATE OF CORRECTION

PATENT NO. : 10,217,074 B1
APPLICATION NO. : 15/690051
DATED : February 26, 2019
INVENTOR(S) : Timothy Stallman et al.

It is certified that error appears in the above-identified patent and that said Letters Patent is hereby corrected as shown below:

In the Claims

Column 35, Lines 56-67 and Column 36, Lines 1-34 please amend Claim 1 as follows:

An inventory management system, comprising:
a workspace;
a plurality of drive units operable to navigate the workspace; [[and]]
a plurality of inventory holders capable of supporting inventory thereon and capable of being transported by the one or more drive units;
a drive unit-navigable grid in the workspace and defining areas where the drive units can navigate;
a modular sorting station comprising:
    a frame defining a first inbound bay and a first outbound bay, wherein each bay is sized to accommodate a drive unit of the one or more drive units with a supported inventory holder containing inventory, and
    wherein each bay is aligned with the drive unit-navigable grid;
    a sensor connected with the modular sorting station and operable to identify the inventory;
    a unique identifier associated with the modular sorting station; and
    a robotic grasper operable to grasp inventory from the inbound bay and release the inventory at the outbound bay, wherein the robotic grasper further comprises at least two robotic arms mounted to respective gantries above the inbound and outbound bays defined by the frame; and
[[ ]]a management component configured with executable instructions, in order to, at least:
    [[ ]]maintain a virtual representation of the workspace including a first grid position associated with the unique identifier of the modular sorting station;
    [[ ]]receive information relating to an inventory item in the inventory system;
    [[ ]]instruct a first drive unit of the one or more drive units to retrieve a first inventory holder containing the inventory item;
    [[ ]]instruct the first drive unit to transport the first inventory holder to the inbound bay of the modular sorting station based on the grid position associated with the unique identifier of the modular sorting station;

Signed and Sealed this
Twenty-fourth Day of September, 2019

Andrei Iancu
*Director of the United States Patent and Trademark Office*

[[     ]]sense, via the sensor, the inventory item in the first inventory holder; and
[[     ]]cause the robotic grasper to move the inventory item from the first inventory holder to the outbound bay of the modular sorting station.